United States Patent
Otsuka et al.

(10) Patent No.: US 8,942,472 B2
(45) Date of Patent: Jan. 27, 2015

(54) COLOR JUDGING APPARATUS, COLOR JUDGING METHOD, IMAGE PROCESSING CIRCUIT AND PROGRAM

(75) Inventors: Koji Otsuka, Osaka (JP); Osamu Manba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 77 days.

(21) Appl. No.: 13/634,560

(22) PCT Filed: May 20, 2011

(86) PCT No.: PCT/JP2011/061665
§ 371 (c)(1),
(2), (4) Date: Sep. 13, 2012

(87) PCT Pub. No.: WO2011/145727
PCT Pub. Date: Nov. 24, 2011

(65) Prior Publication Data
US 2013/0004062 A1    Jan. 3, 2013

(30) Foreign Application Priority Data

May 21, 2010  (JP) ................................. 2010-117856

(51) Int. Cl.
*G06K 9/00*    (2006.01)
*H04N 1/60*    (2006.01)
*H04N 9/73*    (2006.01)

(52) U.S. Cl.
CPC ............... *H04N 1/6027* (2013.01); *H04N 9/73* (2013.01); *H04N 1/6005* (2013.01)
USPC ....................................................... 382/162

(58) Field of Classification Search
CPC . G06T 5/40; G06T 2207/10024; G06T 5/002; G09G 2320/0242; G09G 2320/0233; G09G 2300/0452; G09G 3/2003
See application file for complete search history.

(56) References Cited

U.S. PATENT DOCUMENTS 5,737,032 A * 4/1998 Stenzel et al. ................ 348/649
6,961,037 B2 * 11/2005 Kuwata et al. .................. 345/88

(Continued)

FOREIGN PATENT DOCUMENTS

| CN | 101706965 A | 5/2010 |
| JP | 2000-148978 A | 5/2000 |

(Continued)

OTHER PUBLICATIONS

Yang et al., "Algorithm and Architecture Design of Adaptive Brightness Correction for Video Application", Nov. 2008, IEEE Transactions on Consumer Electronics, vol. 54, No. 4, pp. 1858-1866.*

(Continued)

*Primary Examiner* — Vu Le
*Assistant Examiner* — Guillermo Rivera-Martinez
(74) *Attorney, Agent, or Firm* — Birch, Stewart, Kolasch & Birch, LLP

(57) ABSTRACT

With a pixel included in image data as a reference pixel, a pixel that shares the same pixel value as the reference pixel or a pixel similar to the reference pixel is judged as a shared pixel, and for the pixel judged as the shared pixel, color of the reference pixel is regarded as a color judgment result of the shared pixel, thus making it possible to reduce color calculation processing for the shared pixel. This makes it possible to provide a color judging apparatus operating at higher speed and the like. Thereby, it is possible to provide the color judging apparatus operable at high speed and the like by reducing the number of times of the color calculation processing executed for an input image.

11 Claims, 33 Drawing Sheets

(56) References Cited

U.S. PATENT DOCUMENTS

| | | | |
|---|---|---|---|
| 7,271,812 B2 * | 9/2007 | Van Dyke et al. | 345/603 |
| 2004/0263456 A1 * | 12/2004 | Miyachi et al. | 345/88 |
| 2005/0018054 A1 * | 1/2005 | Kato | 348/222.1 |
| 2005/0169551 A1 * | 8/2005 | Messing et al. | 382/260 |
| 2006/0061842 A1 * | 3/2006 | Oka et al. | 358/522 |
| 2006/0210176 A1 * | 9/2006 | Kajiwara et al. | 382/232 |
| 2006/0215044 A1 * | 9/2006 | Masuda et al. | 348/224.1 |
| 2006/0245017 A1 * | 11/2006 | Aoki et al. | 358/520 |
| 2007/0024634 A1 * | 2/2007 | Speigle et al. | 345/589 |
| 2007/0080975 A1 * | 4/2007 | Yamashita et al. | 345/591 |
| 2007/0223017 A1 * | 9/2007 | Ogawa et al. | 358/1.9 |
| 2010/0027884 A1 * | 2/2010 | Han | 382/167 |
| 2010/0226572 A1 * | 9/2010 | Adachi | 382/167 |
| 2010/0290716 A1 * | 11/2010 | Mori et al. | 382/309 |
| 2011/0037785 A1 * | 2/2011 | Shiomi | 345/690 |
| 2012/0027076 A1 * | 2/2012 | Su | 375/240.02 |

FOREIGN PATENT DOCUMENTS

| | | |
|---|---|---|
| JP | 2005-176028 A | 6/2005 |
| JP | 2008-153753 A | 7/2008 |
| JP | 2010-114667 A | 5/2010 |

OTHER PUBLICATIONS

Messing et al., "Subpixel Rendering on Colour Matrix Displays with 2D Geometries" May 2004, SID 04 Digest, vol. 35, Issue 1, pp. 1474-1477.*

* cited by examiner

FIG. 3
(a)
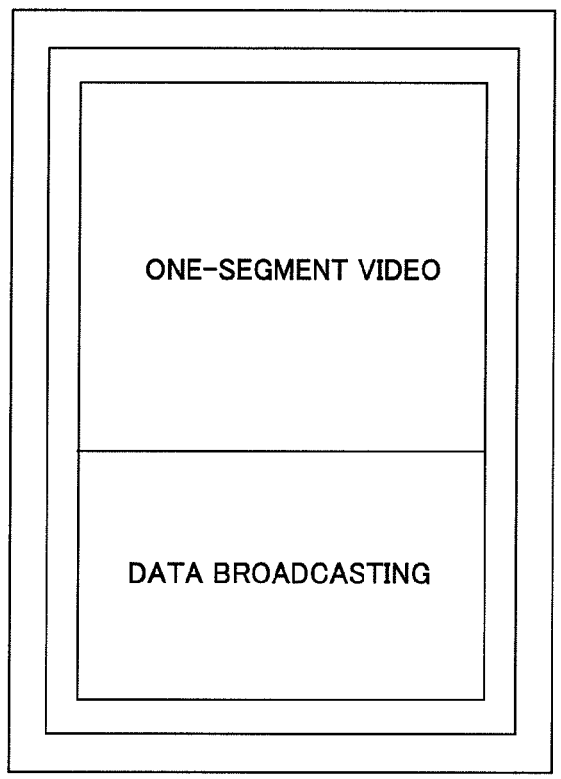
(b)
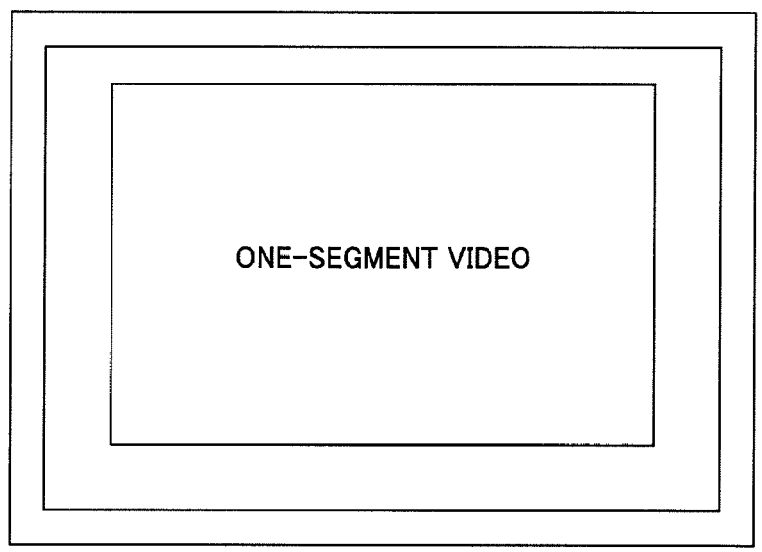

FIG. 4

| ATTRIBUTE 1 | AREA |
|---|---|
| 0 | DON'T CARE |
| 1 | WHOLE (480 X 854) |
| 2 | WHOLE (1920 X 1080) |
| 3 | PARTIAL (80, 20) TO (400, 200) |
| 4 | PARTIAL (60, 107) TO (420, 747) |
| 5 | PARTIAL (320, 60) TO (1600, 1020) |
| 6 | OTHERS |
| 7 | UNKNOWN |

| ATTRIBUTE 2 | FORMAT |
|---|---|
| 0 | DON'T CARE |
| 1 | YUV444 |
| 2 | YUV422 |
| 3 | YUV420 (SEQUENTIAL INPUT) |
| 4 | YUV420 (OTHERS) |
| 5 | YUV411 |
| 6 | YUV9 |
| 7 | RGB888 |
| 8 | OTHERS |
| 9 | UNKNOWN |

| ATTRIBUTE 3 | STATE |
|---|---|
| 0 | DON'T CARE |
| 1 | ONE-SEGMENT VIEWING SOFTWARE IN ACTIVATION |
| 2 | POWER OF TV TURNED ON |
| 3 | ENLARGEMENT OPERATION BY USER |
| 4 | OTHERS |
| 5 | UNKNOWN |

| ATTRIBUTE 4 | INPUT DATA |
|---|---|
| 0 | DON'T CARE |
| 1 | ONE-SEGMENT VIDEO |
| 2 | DIGITAL BROADCASTING |
| 3 | JPEG IMAGE |
| 4 | MPEG IMAGE |
| 5 | OTHERS |
| 6 | UNKNOWN |

| ATTRIBUTE 5 | ENLARGEMENT |
|---|---|
| 0 | DON'T CARE |
| 1 | SAME SIZE |
| 2 | ENLARGE LONGITUDINAL SIZE |
| 3 | ENLARGE LATERAL SIZE |
| 4 | ENLARGE LONGITUDINAL AND LATERAL SIZE |
| 5 | OTHERS |
| 6 | UNKNOWN |

| ATTRIBUTE 6 | MAGNIFICATION |
|---|---|
| 0 | DON'T CARE |
| 1 | TWICE |
| 2 | THREE TIMES |
| 3 | FOUR TIMES |
| 4 | FIVE TIMES |
| 5 | OTHERS |
| 6 | UNKNOWN |

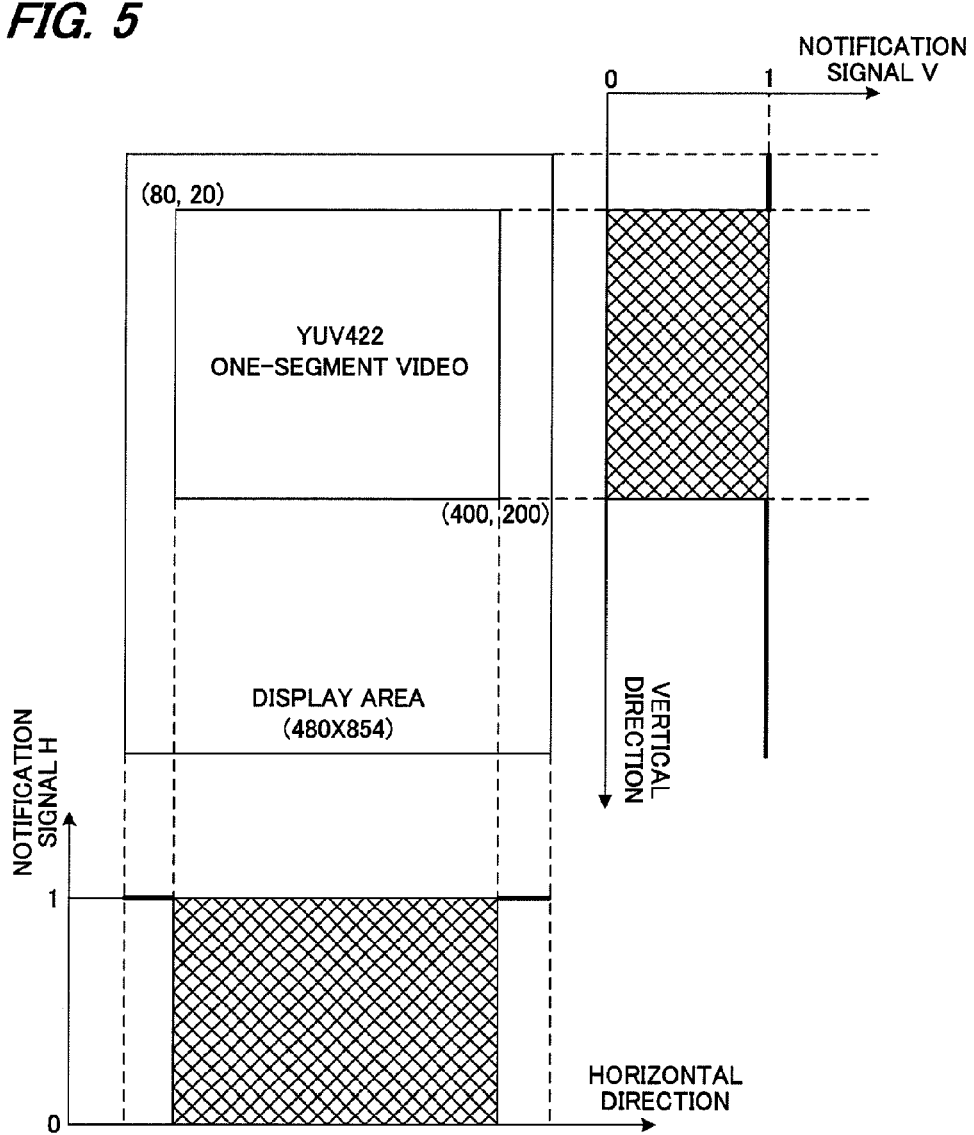

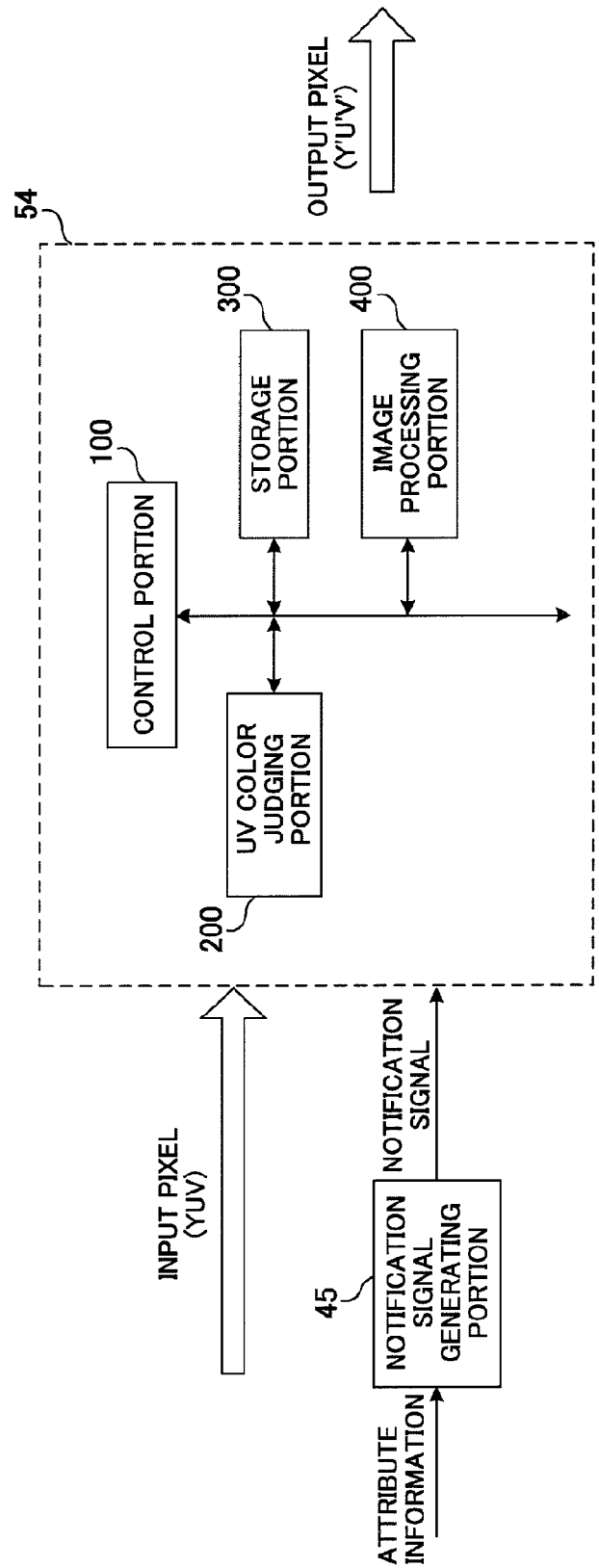

FIG. 10
(a)
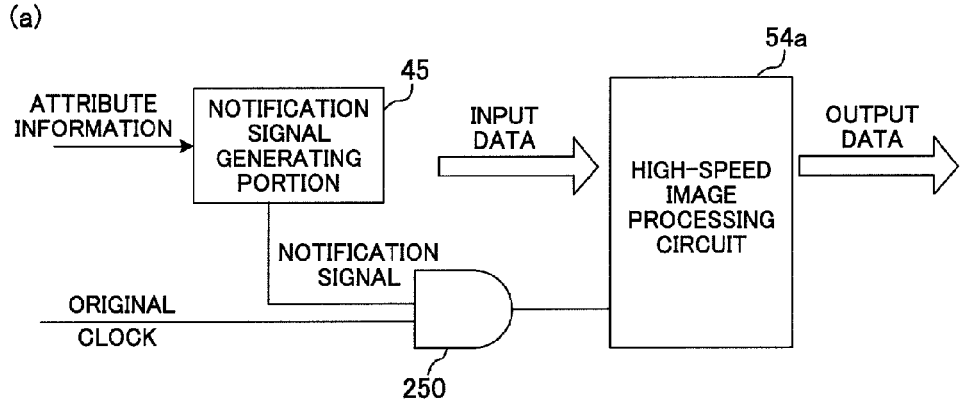
(b)
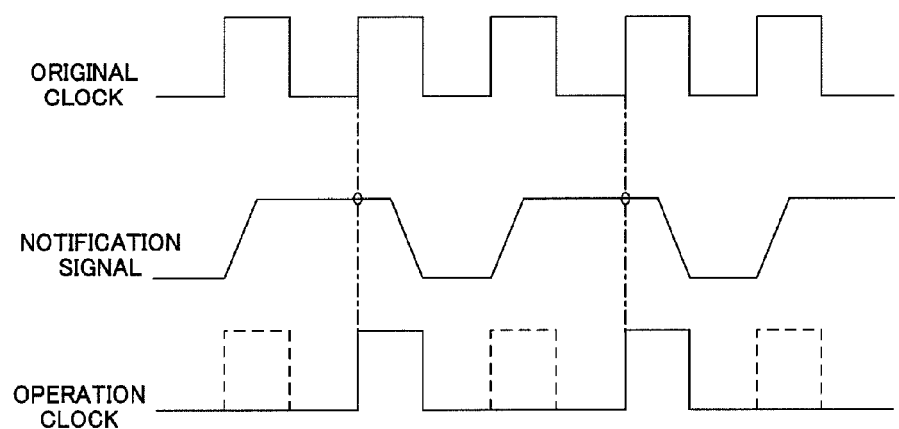

| FIRST PIXEL<br>Y_1<br>U_1<br>V_1 | SECOND PIXEL<br>Y_2<br>U_1<br>V_1 | THIRD PIXEL<br>Y_3<br>U_3<br>V_3 | FOURTH PIXEL<br>Y_4<br>U_3<br>V_3 | ⋯ | 1919-TH PIXEL<br>Y_1919<br>U_1919<br>V_1919 | 1920-TH PIXEL<br>Y_1920<br>U_1919<br>V_1919 |
|---|---|---|---|---|---|---|
| 1921-TH PIXEL<br>Y_1921<br>U_1<br>V_1 | 1922-TH PIXEL<br>Y_1922<br>U_1<br>V_1 | 1923-TH PIXEL<br>Y_1923<br>U_3<br>V_3 | 1924-TH PIXEL<br>Y_1924<br>U_3<br>V_3 | ⋯ | | |
| 3841-TH PIXEL<br>Y_3841<br>U_3841<br>V_3841 | 3842-TH PIXEL<br>Y_3842<br>U_3841<br>V_3841 | 3843-TH PIXEL<br>Y_3843<br>U_3841<br>V_3841 | 3844-TH PIXEL<br>Y_3844<br>U_3841<br>V_3841 | ⋯ | 3839-TH PIXEL<br>Y_3839<br>U_1919<br>V_1919 | 3840-TH PIXEL<br>Y_3840<br>U_1919<br>V_1919 |

(b)

| ADDRESS | 0 | 1 | ⋯ | n | 958 | 959 |
|---|---|---|---|---|---|---|
| | COLOR JUDGMENT RESULT OF FIRST PIXEL<br>1 | COLOR JUDGMENT RESULT OF THIRD PIXEL<br>3 | ⋯ | COLOR JUDGMENT RESULT OF (2n+1)-TH PIXEL<br>(2n+1) | COLOR JUDGMENT RESULT OF 1917-TH PIXEL<br>1917 | COLOR JUDGMENT RESULT OF 1919-TH PIXEL<br>1919 |

FIG. 29
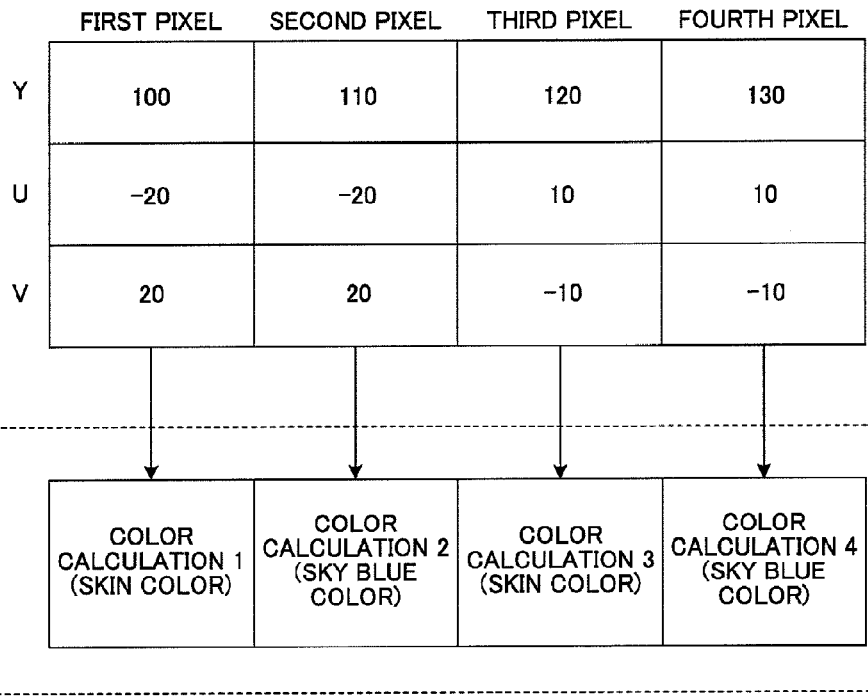
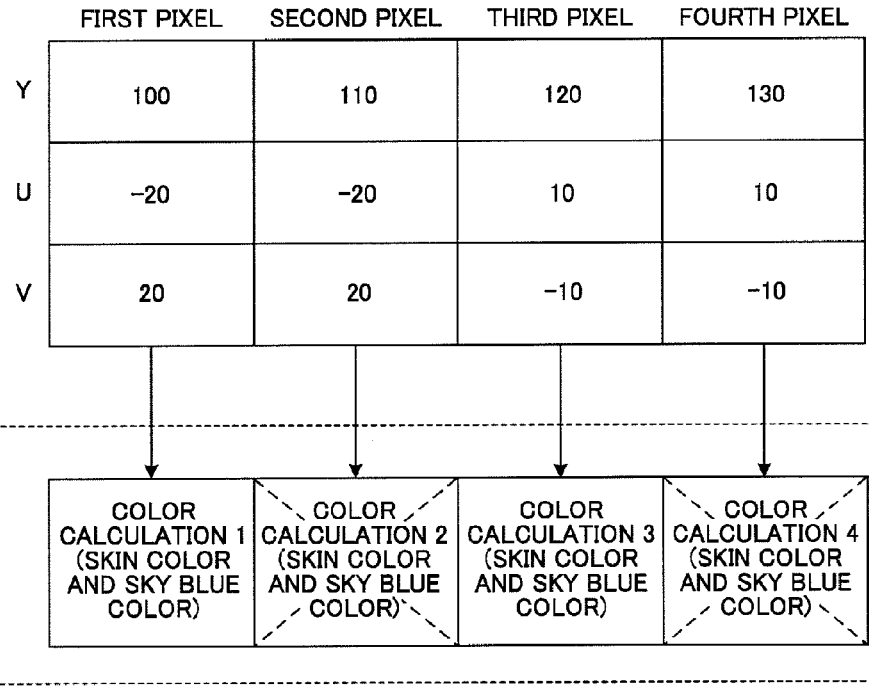

FIG. 34

| COLOR JUDGMENT RESULT cor | CONDITION BRANCH | AREA |
|---|---|---|
| 1 | R≧G>B | R (RED COLOR) |
| 2 | G≧B>R | G (GREEN COLOR) |
| 3 | B≧R>G | B (BLUE COLOR) |
| 4 | B>G≧R | C (CYAN) |
| 5 | R>B≧G | M (MAGENTA) |
| 6 | G>R≧B | Y (YELLOW) |
| 7 | OTHER | UNKNOWN |

FIG. 35
(a)  YUV422
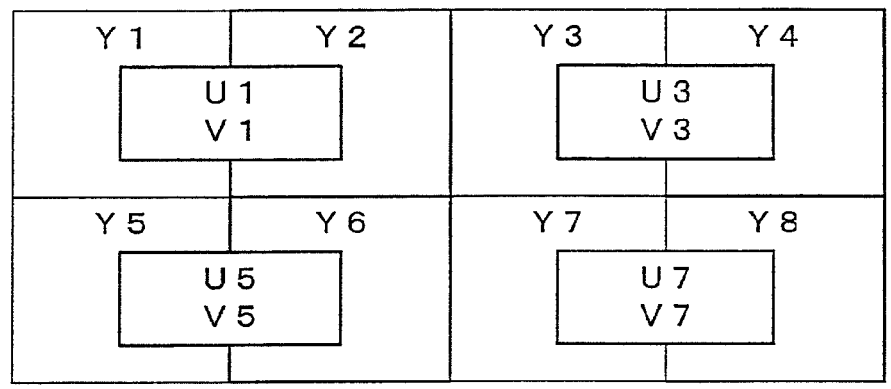
(b)  YUV420
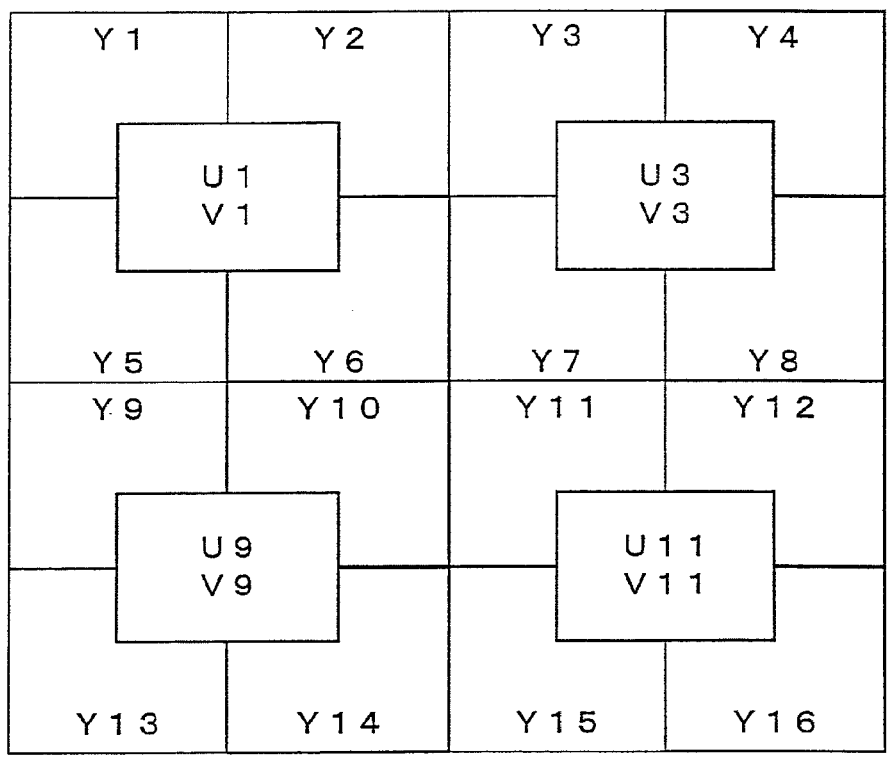

COLOR JUDGING APPARATUS, COLOR JUDGING METHOD, IMAGE PROCESSING CIRCUIT AND PROGRAM

TECHNICAL FIELD

The present invention relates to a color judging apparatus and the like.

BACKGROUND ART

Conventionally, as a technique used for a method for adjusting white balance of a color image, which is a correction method suitable for specific chromatic colors, human memory colors and the like, a technique has been known that whether or not color shown by each pixel is included in a range of predetermined color is judged, and when the color shown by each pixel is included in the range of the predetermined color, the deviation amount of the color shown by the pixel and the predetermined color is able to be obtained (for example, see Patent Literature 1).

In addition, various types of formats of input image data are known. As representative methods, YUV expressed by luminance (Y), color difference (U) which is difference between blue components and luminance, and color difference (V) which is difference between red components and luminance, RGB expressed by a value of red color (R), a value of green color (G), and a value of blue color (B), and the like are known.

In particular, several formats are defined for YUV. For example, various formats are known, including YUV444 (24 bits/1 pixel) in which each of YUV is comprised of 1 sample in each pixel, YUV422 (16 bits/1 pixel) in which Y is comprised of 2 samples and each of UV is comprised of 1 sample in two pixels, YUV420 (12 bits/1 pixel) in which Y is comprised of 4 samples and each of UV is comprised of 1 sample in 4 pixels of 2×2, YUV411, YUV9 and the like.

To show with drawings, YUV444, YUV422 and YUV420 are schematically shown in FIG. 32(*a*), FIG. 32(*b*) and FIG. 32(*c*), respectively.

That is, in YUV422 of FIG. 32(*b*), based on a pixel shown with a bold line (this pixel serving as a basis is referred to as a "reference pixel"), other pixel shares the same pixel value as the reference pixel as to color difference U and color difference V (other pixel which share in a part of the pixel value with the reference pixel is referred to as a "shared pixel"). Moreover, YUV420 of FIG. 32(*c*) is comprised of the reference pixel shown with a bold line and other three pixels as shared pixels.

PRIOR ART LITERATURE

Patent Literature

Patent Literature 1: Japanese Patent Application Laid-open No. 2005-176028

SUMMARY OF THE INVENTION

Problems to be Solved by the Invention

However, there is a problem in the above-described technique of Patent Literature 1 that it takes a lengthy time for processing because it is necessary for all target pixels to judge whether or not each color shown by each pixel is included in the range of predetermined color.

In particular, recently, starting from digital broadcasting, a resolution has been continuously increased for a display area (the number of pixels) of a display apparatus. For example, in the case of full spec high vision of terrestrial digital broadcasting, quite a lot of pixels of 1920×1080 pixels are included. A problem occurs that it takes too much time to judge whether or not to be included in the range of predetermined color for all these pixels.

Further, in recent years, moving image contents such as one-segment broadcasting are often displayed even in a small-sized image processing apparatus such as a mobile phone. In the case of a mobile phone or the like, it can not be said that operation speed of image processing is fast due to restriction to the apparatus, so that a problem occurs that processing of judging whether or not to be included in the range of predetermined color for all the pixels as described above gives a quite large burden.

In view of the above-described problems, the present invention aims to provide a color judging apparatus that is able to operate at high speed by reducing the number of times of judging whether or not to be included in the range of predetermined color for pixels of an input image, and the like.

Means for Solving the Problems

In view of the above-described problems, a color judging apparatus of the present invention is a color judging apparatus comprising:

a color judging portion that calculates a color judgment result of a pixel included in image data by using a pixel value of the pixel for judgment, and a shared pixel judging portion that judges a certain pixel as a reference pixel, and a shared pixel sharing at least one or more pixel values with the reference pixel among pixels included in the image data, wherein the color judging portion, when a current pixel that is a pixel subjected to color judgment is judged as the shared pixel by the shared pixel judging portion, regards a color judgment result of the reference pixel as a color judgment result of the current pixel.

Further, the color judging apparatus of the present invention is characterized in that the pixel includes a luminance value or a brightness value as the pixel value, and the shared pixel judging portion judges a pixel that has the same pixel value other than the luminance value or the brightness value as the reference pixel, as the shared pixel.

Further, the color judging apparatus of the present invention is characterized in that, in the shared pixel judging portion, attribute information about the image data is input, a format of the image data is specified from the input attribute information and the shared pixel is judged based on the format of the image data.

Further, the color judging apparatus of the present invention is characterized in that, the shared pixel judging portion generates a luminance distribution of each pixel included in the image data and judges the shared pixel based on the generated luminance distribution.

Further, the color judging apparatus of the present invention is characterized in that, the pixel includes an RGB value as the pixel value, and the shared pixel judging portion judges a pixel having the same RGB value as each RGB value of the reference pixel as the shared pixel.

Further, the color judging apparatus of the present invention is characterized in that, a color judgment area is set as an area where the color judging portion performs color judgment in the image data, and the color judging portion performs color judgment for the pixel included in the color judgment area.

Further, the color judging apparatus of the present invention is characterized in that, for the shared pixel, the color judging portion performs color judgment of color different from a specified color judged in the reference pixel.

A color judging method of the present invention is a color judging method comprising:

a color judgment step of calculating a color judgment result of a pixel included in image data by using a pixel value of the pixel for judgment, and a shared pixel judgment step of judging a certain pixel as a reference pixel, and a shared pixel sharing at least one or more pixel values with the reference pixel among pixels included in the image data, wherein the color judgment step, when a current pixel that is a pixel subjected to color judgment is judged as the shared pixel at the shared pixel judgment step, regards a color judgment result of the reference pixel as a color judgment result of the current pixel.

An image processing circuit of the present invention is an image processing circuit comprising:

a color judging circuit that calculates a color judgment result of a pixel included in image data by using a pixel value of the pixel for judgment, and a shared pixel judging circuit that judges a certain pixel as a reference pixel, and a shared pixel sharing at least one or more pixel values with the reference pixel among pixels included in the image data, wherein the color judging circuit, when a current pixel that is a pixel subjected to color judgment is judged as the shared pixel by the shared pixel judging circuit, regards a color judgment result of the reference pixel as a color judgment result of the current pixel.

A program of the present invention is a program causing a computer to realize a color judgment function of calculating a color judgment result of a pixel included in image data by using a pixel value of the pixel for judgment, and is characterized in that a shared pixel judgment function that judges a certain pixel as a reference pixel, and a shared pixel sharing at least one or more pixel values with the reference pixel among pixels included in the image data, is realized, and the color judgment function, when a current pixel that is a pixel subjected to color judgment is judged as the shared pixel by the shared pixel judgment function, regards a color judgment result of the reference pixel as a color judgment result of the current pixel.

Advantages of the Invention

According to the present invention, a certain pixel among pixels included in image data is judged as a reference pixel, and a pixel that sharing at least one pixel values with the reference pixel among pixels included in image data is judged as a shared pixel. In addition, when color judgment is performed for the pixel included in the image data, for the shared pixel, a color judgment result of the reference pixel is regarded as a color judgment result of the shared pixel. That is, since processing of calculating color is not performed for the pixel judged as the shared pixel, it is possible to reduce processing time with respect to color judgment, thus making it possible to provide a color judging apparatus that operates at higher speed and the like.

BRIEF DESCRIPTION OF THE DRAWINGS

FIG. 3 is a view for describing an area of a display screen in the embodiment.

FIG. 4 is a view for describing attribute information in the embodiment.

FIG. 5 is a view for describing a color judgment area in the embodiment.

FIG. 6 is a view for describing a functional configuration of a high-speed image processing portion in a first embodiment.

FIG. 10 is a view for describing a high-speed image processing circuit in the first embodiment.

FIG. 25 is a view for describing an operation of the fourth embodiment.

FIG. 29 is a view for describing an operation of a sixth embodiment.

FIG. 34 is a view for describing color judgment processing.

FIG. 35 is a schematic view for describing image data.

MODE FOR CARRYING OUT THE INVENTION

Description will be hereinafter given for a best mode for carrying out the present invention with reference to drawings. Note that, in the present embodiment, description will be given for the case where a color judging apparatus to which the present invention is applied is included in a mobile phone 1 as an example. Hereinafter, after describing a whole configuration and a functional configuration of the mobile phone 1, description will be given for a processing flow when the present invention is applied and a modified example to which the present invention is applicable.

1. First Embodiment

[1.1 Whole Configuration]

Figure 1:
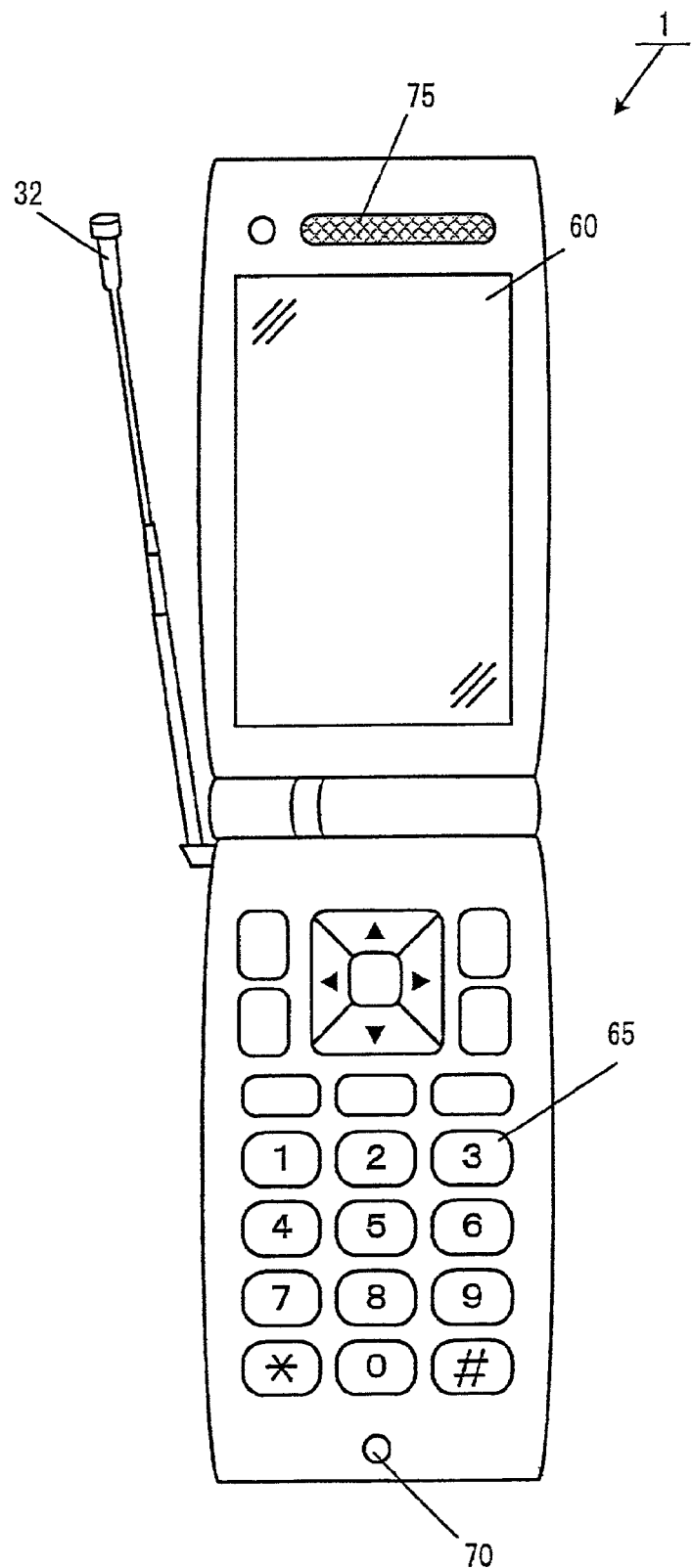
FIG. 1 is an external view of a mobile phone (color judging apparatus) in an embodiment.

FIG. 1 is a view showing an external appearance of the mobile phone 1 in the present embodiment. The mobile phone 1 includes a display portion 60 configured by a liquid crystal display and the like, an operation portion 65 configured by input buttons and the like, a microphone portion 70 that receives input of voice, and a speaker portion 75 that outputs voice.

Further, a receiving antenna 32 for receiving terrestrial digital broadcasting broadcasted from a broadcast station, and a communication antenna (not shown) for receiving transmitted/received signal from a mobile phone base station are included together.

[1.2 Functional Configuration]

[1.2.1 Functional Configuration of Mobile Phone]

Figure 2:
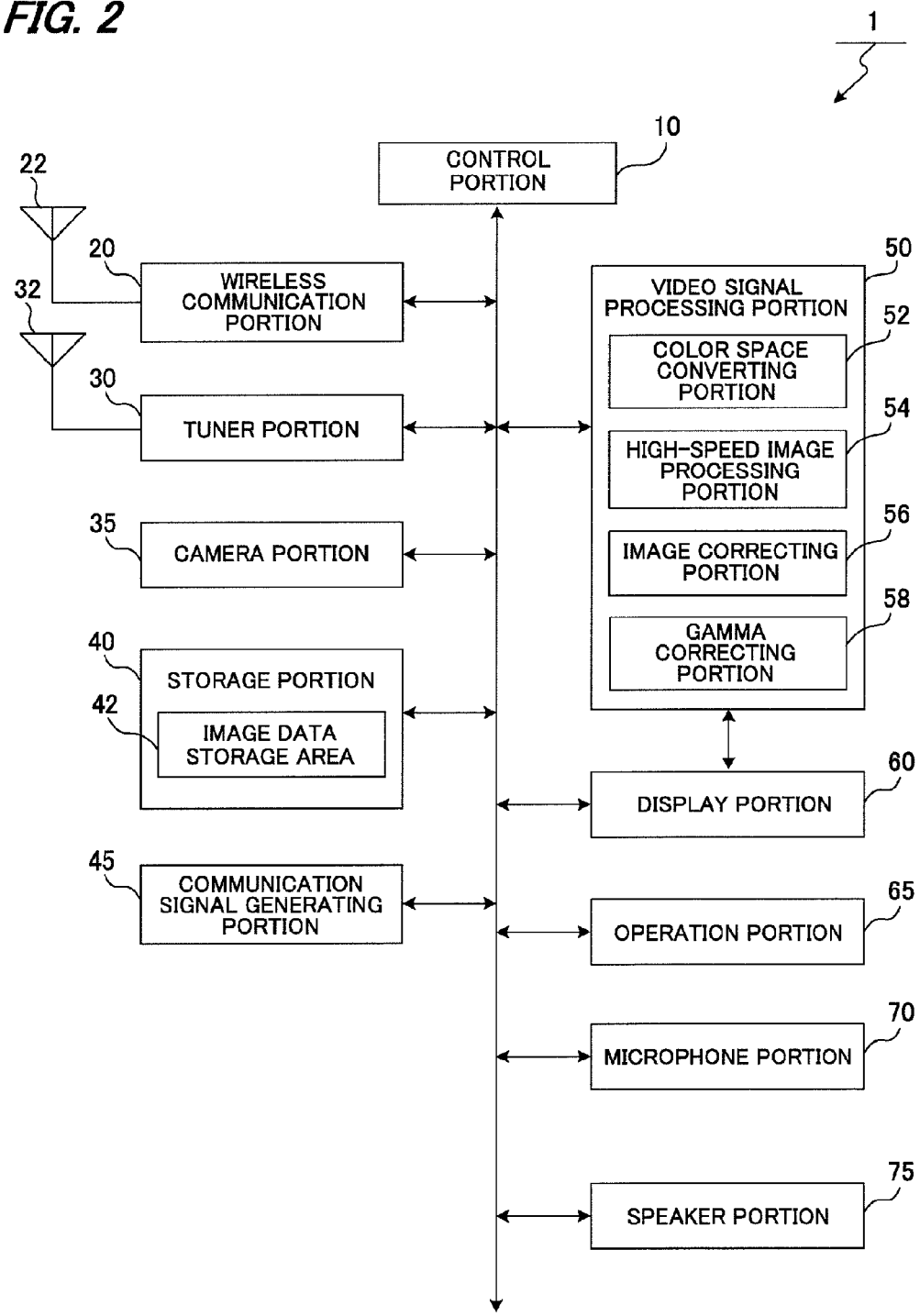
FIG. 2 is a view for describing a functional configuration of the whole mobile phone in the embodiment.

Subsequently, description will be given for the functional configuration of the mobile phone 1 with FIG. 2. FIG. 2 is a view for describing the functional configuration of the mobile phone 1, in which a wireless communication portion 20, a tuner portion 30, a camera portion 35, a storage portion 40, a notification signal generating portion 45, a video signal processing portion 50, the display portion 60, the operation portion 65, the microphone portion 70, and the speaker portion 75 are connected to a control portion 10.

The control portion 10 is a functional portion for controlling the whole of the mobile phone 1. The control portion 10 realizes various functions by reading and executing various programs stored in the storage portion 40, and is configured by, for example, a CPU (Central Process Unit) and the like.

The wireless communication portion 20 is a functional portion for connecting to a mobile phone communication network, and is connected with a communication antenna 22. Communication data is transmitted/received to/from a base station through the communication antenna 22 and is input/output to the control portion 10. Note that, the functional portions, namely the wireless communication portion 20 and the communication antenna 22, are functional portions that become necessary when the mobile phone 1 is used as a telephone function, and detailed description of which will be omitted.

The tuner portion 30 is connected with the receiving antenna 32, and is a functional portion that extracts through the receiving antenna 32 data of transport stream (TS) (TS data) from broadcast wave corresponding to a broadcast station selected by a user for output. The output TS data is output by the display portion 60 and the speaker portion 75 through the video signal processing portion 50, or stored in an image data storage area 42 of the storage portion 40. Note that, the tuner is able to receive terrestrial digital broadcasting in the present embodiment.

The camera portion 35 is a functional portion that outputs an image (a still image or a moving image) formed on an image capturing element, for example, such as a CCD (Charge Coupled Device) through a lens by a user as image data. The output image data is displayed on the display portion 60 through the video signal processing portion 50 or stored in the image data storage area 42 of the storage portion 40.

The storage portion 40 is a functional portion in which various programs necessary for the operation of the mobile phone 1 and various data are stored. The storage portion 40 is configured by, for example, a semiconductor memory, an HDD (Hard Disk Drive) and the like. In addition, the storage portion 40 secures the image data storage area 42, in which image data is stored. Note that, the image data in the present embodiment may be so-called still image data such as a photo (for example, still image data in the JPEG format, the TIFF format or the like) or so-called moving image data such as a video (moving image data in the AVI format, the MPEG format or the like).

The notification signal generating portion 45 is a functional portion that determines an area of a pixel processed by the high-speed image processing portion 54 (color calculation area) based on input attribute information, and generates notification signal that notifies of a pixel to be subjected to color calculation processing. The notification signal is output to the high-speed image processing portion 54 and the high-speed image processing portion 54 executes color judgment processing or the like based on the notification signal.

The notification signal generating portion 45 judges whether or not the color calculation processing is necessary for a pixel that is currently processed and generates and outputs the notification signal. Then, "1" (ON) is output as the notification signal for a pixel for which the color calculation processing is executed (for example, a reference pixel), and "0" (OFF) is output as the notification signal for a pixel for which the color calculation processing is not executed (for example, a shared pixel). Note that, when there is no shared pixel (for example, in the case of YUV444 or the like), the notification signal of "1" is output for all the pixels.

In addition, when color judgment is executed, it is also possible to execute the color calculation processing over the whole display area as shown in FIG. 3, but, for example, when the mobile phone 1 provides longitudinal display (FIG. 3(a)), the color judgment is preferably performed for an area where a one-segment video (for example, YUV420) is displayed as an area where the YUV420 format is displayed. Further, in an area where display is not performed in the YUV420 format, such as a data broadcasting area, accuracy is lowered when the color calculation processing is not performed.

That is, by applying the color judgment of the present invention to a one-segment video being displayed by YUV420 and applying conventional processing or the processing of the present invention as being the YUV444 format for other areas, it becomes possible to perform the color judgment only for a required portion without lowering accuracy at high speed.

This is also the case with the case of lateral display as shown in FIG. 3(b). For example, when a display area of a one-segment video is displayed in twice enlargement by nearest neighbor, the color judgment of the present invention is applied to the one-segment video and conventional processing or the processing of the present invention as being the YUV444 format is applied to other areas.

As described above, it is the notification signal generating portion 45 that generates and outputs the notification signal showing whether or not to execute the color calculation processing for a pixel processed at the high-speed image processing portion 54.

Here, description will be specifically given for attribute information. The attribute information is information shown with a six-digit number of "1, 2, 3, 4, 5, 6 (123456)" in the case of the present embodiment. In addition, an attribute 1, an attribute 2, an attribute 3, an attribute 4, an attribute 5 and an attribute 6 are shown, respectively from the first digit at the left end.

Here, description will be given for details of each attribute with a table of FIG. 4. The attribute information is configured by the attribute 1 showing an area to be processed by the high-speed image processing portion 54 among input video data, the attribute 2 showing a format of image data, the attribute 3 showing a state of the mobile phone 1, the attribute 4 showing a type of input data, the attribute 5 showing whether input data is enlarged, and the attribute 6 showing a magnification in the case of being enlarged.

For example, when "321110" is input as the attribute information, the following attributes are read when the display portion provides longitudinal display in the mobile phone 1.

Area: Partial (80, 20) to (400, 200)
Format: YUV422
State: One-segment viewing software inactivation
Input data: One-segment video
Enlargement: Same size
Magnification: Don't care The state at this time will be described based on FIG. 5. In this case, for an area where the color calculation processing is executed (color calculation area) at the high-speed image processing portion 54, "1" is generated and output as the notification signal. On the other hand, for an area where the color calculation processing is not executed, "0" is generated and output as the notification signal.

That is, for the area where the color calculation processing is executed (that is, the area in which image data of the YUV422 format is displayed), "1" is output.

Further, even in an area in which a one-segment video is displayed, for example, in the case of YUV422, notification signal H is generated by repeating "0" and "1" every one pixel. Further, in the case of YUV420, "1" and "0" are repeatedly output everyone line. Then, the notification signal is expressed by logical product of the notification signal H and notification signal V (notification signal H×notification signal V).

The video signal processing portion 50 is a functional portion in which image data or the like stored in the tuner portion 30, the camera portion 35 or the image data storage area 42 is input and subjected to various processing, and then output to the display portion 60. The video signal processing portion 50 includes a color space converting portion 52, the high-speed image processing portion 54, an image correcting portion 56, and a gamma correcting portion 58.

The color space converting portion 52 is a functional portion for converting a color space. For example, it is the functional portion that converts from RGB to YUV (YCbCr/YPbPr) or converts from YUV to RGB. Since the way of converting a color space is a well-known technique, detailed description of which will be omitted, but by using the following conversion formula, for example, it is possible to convert a color space.

(Convert RGB→YUV)

$Y=0.299R+0.587G+0.114B$ $U=-0.169R-0.331G+0.5B$ $V=0.5R-0.419G-0.081B$ (Convert YUV→RGB)

$R=Y+1.402V$ $G=Y-0.344U-0.714V$ $B=Y+1.772U$

The high-speed image processing portion 54 is a functional portion for performing image processing at high speed when the image processing is applied to an input image, and the high-speed image processing portion 54 will be described below in detail.

The image correcting portion 56 is a functional portion that performs various correction for input image data and image data to be output. For example, it is the functional portion that performs enlargement/reduction processing of image data and the like or sharpening (edge enhancement).

The gamma correcting portion 58 is a functional portion that performs gamma correction of input image data. By performing gamma correction, an image with appropriate luminance is output by the display portion 60. Here, as a gamma correction value, one determined in advance based on image data or a value calculated in each case may be used, or a value set by a user may be used.

The display portion 60 is a functional portion for displaying an image output from the video signal processing portion 50 or displaying information provided for a user. The display portion 60 is configured by, for example, a liquid crystal display (LCD), an organic EL panel or the like.

The operation portion 65 is a functional portion for receiving input of various operation instructions and the like from a user. The operation portion 65 is configured by, for example, a button key, a touch panel and the like.

The microphone portion 70 and the speaker portion 75 are functional portions for inputting and outputting sound (voice). The voice input from the microphone portion 70 is converted to voice data, output to the control portion 10, and output to each functional portion as appropriate. In addition, the speaker portion 75 is a functional portion that converts voice data output by each functional portion to voice for output.

That is, image data is input from the tuner portion 30, the camera portion 35 or the storage portion 40. The input image data is then subjected to video signal processing by the video signal processing portion 50. Then, the image subjected to the video processing is to be output to the display portion 60.

[1.2.2 Functional Configuration of High-Speed Image Processing Portion]

Subsequently, description will be given in detail for the functional configuration of the high-speed image processing portion 54. The high-speed image processing portion 54 is configured so that a UV color judging portion 200, a storage portion 300 and an image processing portion 400 are connected to a control portion 100 as shown in FIG. 6. Moreover, in the present embodiment, to the high-speed image processing portion 54, an input pixel (YUV) as a pixel included in image data is input as input data, and after being subjected to image processing, an output pixel (Y'U'V') is output.

Figure 7:
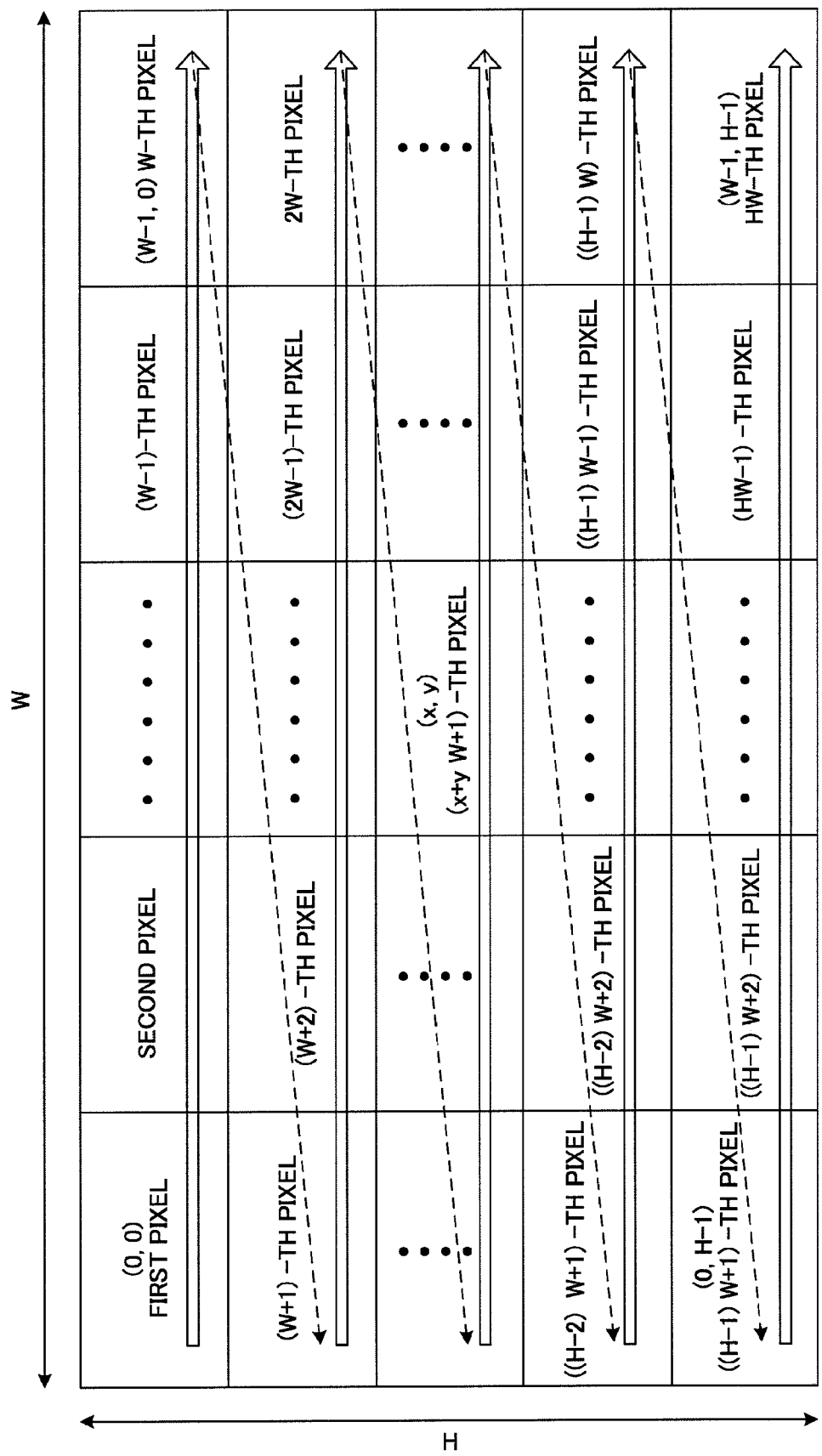
FIG. 7 is a schematic view for describing image data.

Here, as the whole image data, the image data with a size of W in width and H in height (whose pixel number is W pieces in width and H pieces in height) is input, for example, as shown in FIG. 7. Then, pixels are input sequentially one by one to the high-speed image processing portion 54. That is, first, pixels in the first line are input from the left side to the right side in turn in an arrow direction of FIG. 7. Then, when the pixels in the first line are finished to be input, pixels in the next second line are input from the left side in turn. Note that, in the present embodiment, it is expressed such that a (2n−1)-th pixel in the lateral direction is an odd-number pixel and a 2n-th pixel is an even-number pixel. Here, n is a natural number.

Further, notification signal is input from the notification signal generating portion 45 to the high-speed image processing portion 54. The notification signal generating portion 45 generates and outputs the notification signal showing whether or not to perform the color calculation processing in the high-speed image processing portion 54 based on, for example, attribute information about image data.

Subsequently, description will be given for the operation of each functional portion. First, the control portion 100 is a functional portion for controlling the whole of the high-speed image processing portion 54.

The UV color judging portion 200 is a functional portion for performing color judgment of each pixel. Description will be given assuming that color judgment is performed based on a color space of YUV in the present embodiment. In addition, the UV color judging portion 200 executes the color judgment based on the notification signal input from the notification signal generating portion 45.

Figure 8:
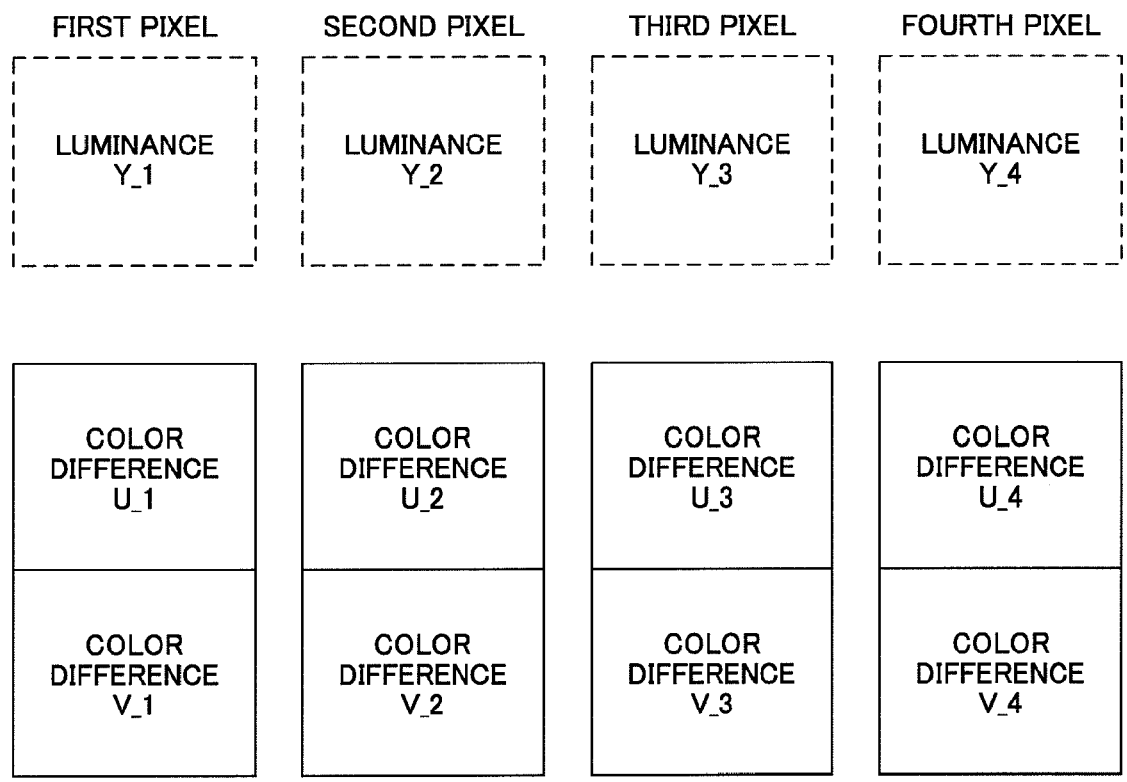
FIG. 8 is a view for describing an operation of a UV color judging portion in the first embodiment.

The operation of the UV color judging portion 200 will be described with FIGS. 8 and 9. Here, FIG. 8 is a view schematically showing pixels (first to fourth pixels). The first pixel, the second pixel, the third pixel and the fourth pixel are input in this order. Each pixel has a pixel value expressed by a luminance value (luminance Y) and a color difference value (color difference U, color difference V). First, notification signal is input from the notification signal generating portion 45. Based on the notification signal, the UV color judging portion 200 judges whether or not to execute the color calculation processing.

Figure 9:
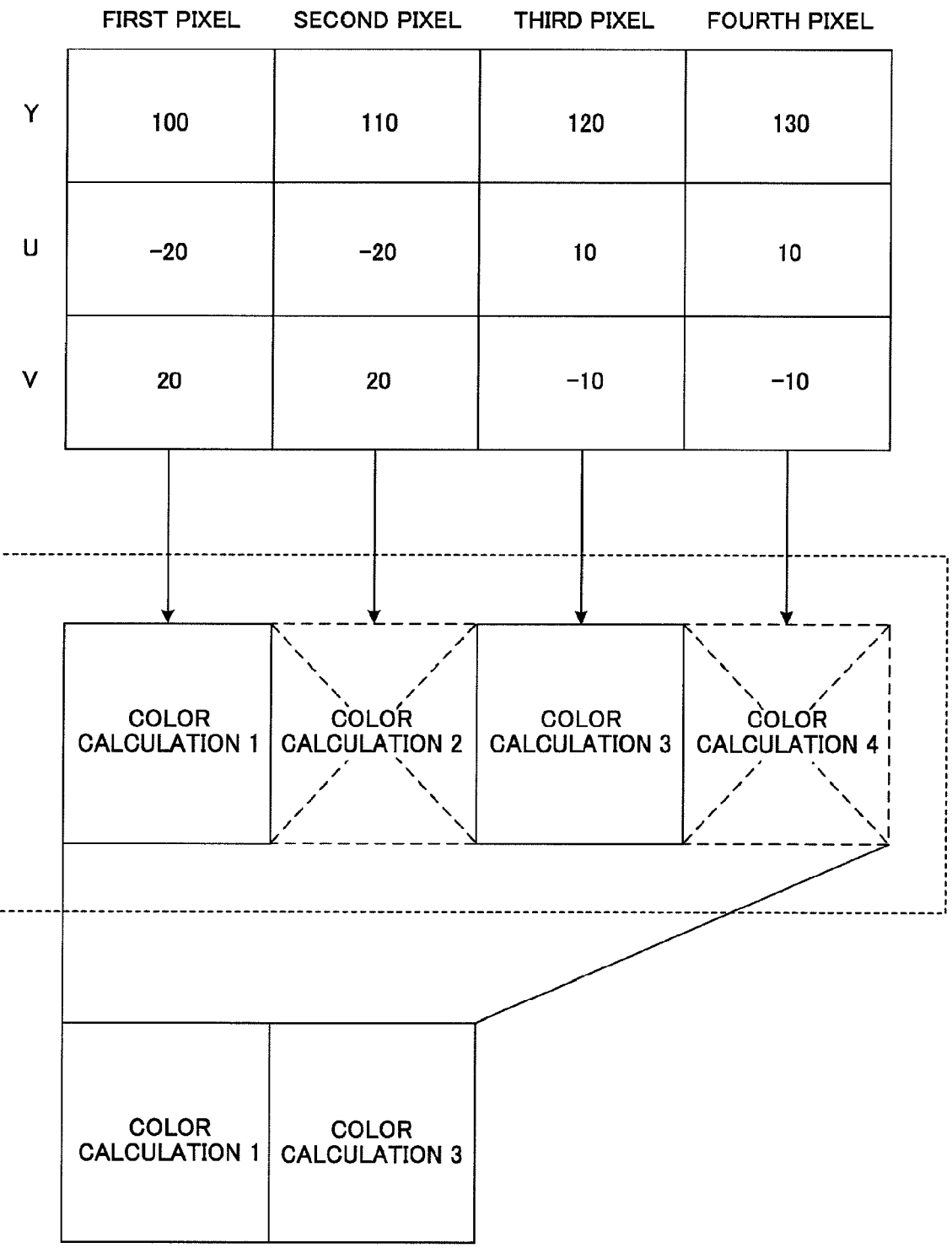
FIG. 9 is a view for describing an operation of the UV color judging portion in the first embodiment.

For example, image data shown in FIG. 9 shows image data in the YUV422 format. Here, the luminance Y is able to be expressed in the range of "0" to "1" by normalization. Note that, in the case of expressing by 8 bits, it is possible to express as "0" to "255". In the following embodiment, description will be given with the case of expressing by "0" to "255". In addition, the color differences U and V are also able to be expressed in the range of "−½" to "½" by normalization. Note that, in the case of expressing by 8 bits, it is possible to express as "−128" to "127". In the following embodiment, description will be given with the case of expressing by "−128" to "127". In the case of the YUV422 format, with respect to the odd-number pixel and the even-number pixel, Y (luminance) is different, but U and V (color difference) become the same.

That is, the color difference U between the first pixel (odd-number pixel) and the second pixel (even-number pixel) which is "−20" and the color difference V which is "20" are the same, that is, shared. Accordingly, the first pixel is judged as the reference pixel, so that the notification signal of "1" is output and the second pixel is judged as the shared pixel, so that the notification signal of "0" is output, and the color calculation processing (color calculation 1) is executed for the first pixel, while the color calculation processing (color calculation 2) is not executed for the second pixel.

In addition, the color difference U between the third pixel (odd-number pixel) and the fourth pixel (even-number pixel) which is "10" and the color difference V which is "−10" are the same, that is, shared. Accordingly, the third pixel is judged as the reference pixel, so that the notification signal of "1" is output and the fourth pixel is judged as the shared pixel, so that the notification signal of "0" is output, and the color calculation processing (color calculation 3) is executed for the third pixel, while the color calculation processing (color calculation 4) is not executed for the fourth pixel.

Thereby, when time required for the color calculation processing for one pixel is t, the color calculation processing has conventionally taken time of 4 t for four pixels, while in the present embodiment, it is possible to reduce to time of 2 t.

Further, the pixel value of the color difference is originally shared between the odd-number pixel and the even-number pixel, and even when the color calculation processing of the shared pixel is not performed, it is possible to increase the speed of the processing without lowering accuracy of image processing.

Note that, even when an input format is unknown from the attribute information, it is possible to generate the notification signal in the notification signal generating portion 45.

Specifically, for an area where color judgment is executed (color judgment area), luminance distribution (histogram) of input luminance values of the whole area is obtained. Then, when a count value (number of distribution) of the obtained luminance distribution (histogram) is necessarily a multiple of two, it is judged as YUV422. In addition, when the count value (number of distribution) is necessarily a multiple of four, it is judged as YUV420. In this manner, even when the format of an input image is unknown, it is possible to generate the notification signal.

The storage portion 300 is a functional portion that stores a color judgment result of each pixel in the high-speed image processing portion 54. In addition, the image processing portion 400 is a processing portion that converts an image based on a color judgment result judged by the UV color judging portion 200.

Note that, as a circuit using hardware, the above-described high-speed image processing portion 54 is able to realize the function even as a high-speed image processing circuit 54a. For example, FIG. 10(a) is a view showing an example of the high-speed image processing circuit 54a by hardware.

To the high-speed image processing circuit 54a, the notification signal generating portion 45 is connected through an AND circuit 250. Here, to the AND circuit 250, the notification signal ("0", "1") from the notification signal generating portion 45 and an original clock are input.

This makes it possible to control so that an operation clock is not input to the high-speed image processing circuit 54a (color judging portion) when the notification signal is "0". Thereby, a control circuit of the UV color judging portion 200 is operated only for the case of a necessary pixel, thus making it also possible to suppress power consumption as a whole of the high-speed image processing circuit 54a.

[1.3 Processing Flow]

Subsequently, description will be given for a processing flow of the high-speed image processing portion 54 and an operation of the notification signal generating portion 45 in the present embodiment with FIG. 11. This processing may be realized, for example, in the high-speed image processing portion 54 by that the control portion 100 executes a program stored in the storage portion 300 or that each functional portion is configured by hardware and controlled. In addition, processing (step S1250, step S1300 and step S1350) surrounded by a dotted line of the drawing is set as color judgment processing (step S1230).

First, each variable number is initialized (step S1000). Here, a variable number i denotes a pixel (1 to WH). The tmp is a variable number storing a color judgment result of a reference pixel.

Subsequently, pixel input processing (step S1100) and notification signal generation processing (step S1200) are sequentially executed for the pixel i. Then, whether or not notification signal nos is "1" is judged (step S1250). The notification signal nos is the signal generated at the notification signal generation processing of step S1200, and color calculation processing (step S1300) is performed in the case of "1" and processing of substituting a color judgment result of the reference pixel into a color judgment result of the current pixel (step S1350) is performed in the case of "0". Next, each of image processing (step S1400) and pixel output processing (step S1500) is sequentially executed. The operation of each step will be described below with the drawing.

After each processing of steps S1100 to S1500 described above is executed, 1 is added (incremented) to the variable number i (step S1600), and similar processes are applied to a next pixel. That is, in the case of being not finished for all the pixels, the processing is repeatedly executed from step S1100 (step S1700; No step S1100). On the other hand, in the case of being finished for all the pixels, the processing is finished (step S1700; Yes). Description will be given below for the processing from steps S1100 to S1500.

[1.3.1 Pixel Input Processing]

Figure 12:
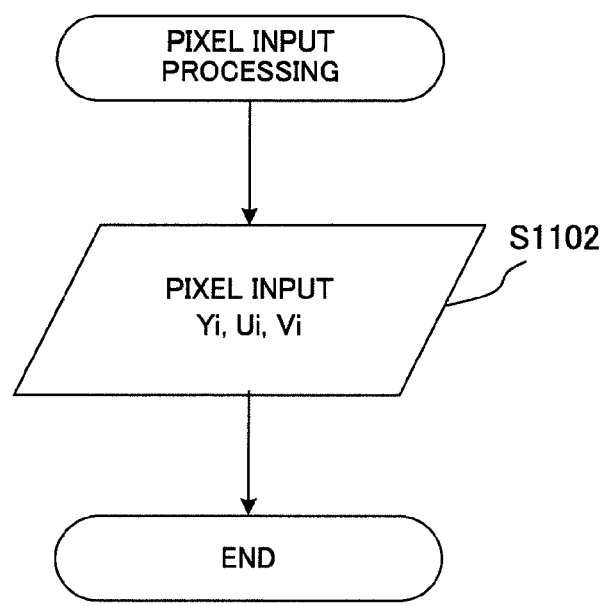
FIG. 12 is a view for describing pixel input processing in the first embodiment.

First, description will be given for the pixel input processing with FIG. 12. In the pixel input processing, YUV values of a certain pixel of image data are input (read out). The input pixel values are set as Yi, Ui and Vi (step S1102).

[1.3.2 Notification Signal Generation Processing]

Figure 13:
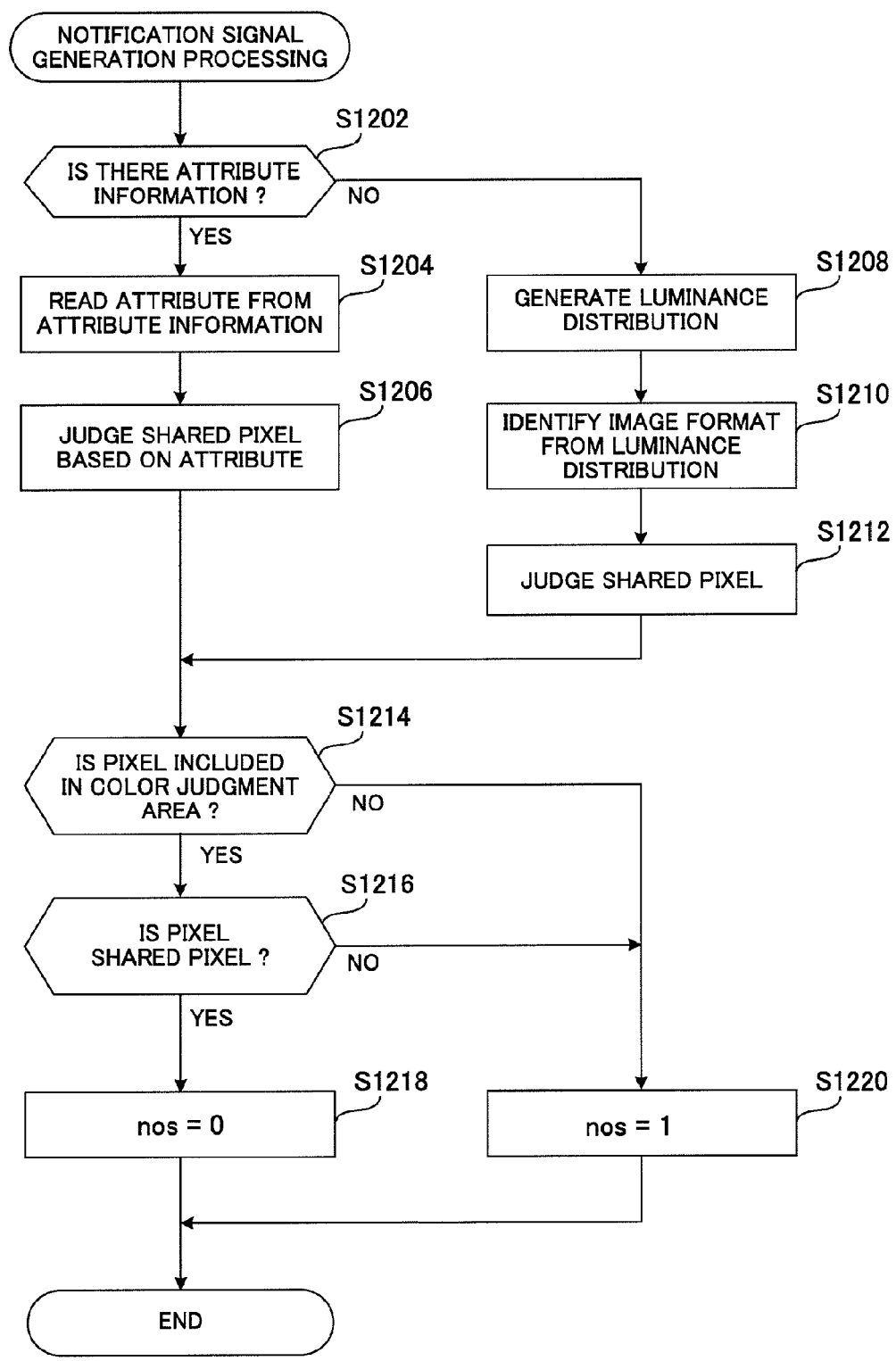
FIG. 13 is a view for describing notification signal generation processing in the first embodiment.

Next, description will be given for the notification signal generation processing with FIG. 13. Note that, though the notification signal generation processing is processing executed at the notification signal generating portion 45, this notification signal generating portion 45 may be included in the high-speed image processing portion 54.

First, the notification signal generating portion 45 judges whether or not there is necessary attribute information (step S1202). Here, when attribute information is input to the notification signal generating portion 45 and necessary attribute information is included, a predetermined attribute is read from the attribute information, and whether or not the current pixel is a shared pixel is judged based on the read attribute (step S1202; Yes→step S1204→step S1206).

Here, as an example, the attribute that is read out may include the attribute 2 "format", the attribute 5 "enlargement" and/or the attribute 6 "magnification" in FIG. 4.

For example, when the attribute is "2" in the attribute 2 "format", it is shown that the image format of the input image is "YUV422". In this case, since the odd-number pixel serves as the reference pixel and the even-number pixel serves as the shared pixel, the current pixel is judged as the shared pixel when being the even-number pixel.

Description will be given for a basic concept for obtaining the reference pixel and the shared pixel with reference to FIG. 7. In FIG. 7, x is a horizontal position (lateral position) of a pixel, and "0" is the left end and "W−1" is the right end. The y is a vertical position (longitudinal position) of the pixel, and "0" is the upper end and "H−1" is the lower end. Note that, a position of an arbitrary pixel is expressed with (x, y), so that the pixel at the position of (x, y) is (x+y W+1)-th pixel. The notification signal generating portion 45 (or the high-speed image processing portion 54) is able to define x and y using the lateral-direction pixel number W, the longitudinal-direction pixel number H, and the variable number which are given. It is possible to use values recorded in a header of image data for W and H.

In the case of the YUV422 format, a pixel at the position satisfying (x mod 2)=0 among pixels at the position of (x, y) serves as the reference pixel, and others serve as shared pixels. When the position of the shared pixel is (x1, y1), the position of the reference pixel sharing the color difference is ((x1−(x1 mod 2), y1). Moreover, in the case of the YUV420 format, a pixel at the position satisfying (x mod 2)=0 and (y mod 2)=0 among pixels at the position of (x, y) serves as the reference pixel, and others serve as shared pixels. When the position of the shared pixel is (x2, y2), the position of the reference pixel sharing the color difference is ((x2−(x2 mod 2), y2−(y2 mod 2)).

This processing will be described more specifically with FIG. 35. FIG. 35(a) shows image data of 4×2 pixels in the YUV422 format. In addition, FIG. 35(b) shows image data of 4×4 pixels in the YUV420 format. The number attached to YUV shows a pixel number.

First, description will be given for the case where input is performed in the order shown in FIG. 7 in the YUV422 format of FIG. 35(a). The color differences U1 and V1 of the first pixel and the second pixel are shared. Subsequently, the color differences are shared between the third pixel and the fourth pixel, between the fifth pixel and the sixth pixel, and between the seventh pixel and the eighth pixel. Pixels sharing the color differences are continuously input in the order of the first pixel, the second pixel, the third pixel, the fourth pixel, the fifth pixel, the sixth pixel, the seventh pixel and the eighth pixel for processing.

When the first pixel is input, between the first pixel and the second pixel that share the color differences U1 and V1, the first pixel that is input earlier serves as the reference pixel. Then, "1" is generated as the notification signal to execute the color calculation processing.

Next, when the second pixel is input, among the first pixel and the second pixel that share the color differences U1 and V1, the second pixel that is input later serves as the shared pixel. Then, "0" is generated as the notification signal, and the color judgment result of the first pixel that is the reference pixel is used for the color judgment result of the second pixel that is the shared pixel.

Next, when the third pixel is input, the color differences U3 and V3 of the third pixel are not shared with the color differences U1 and V1 of the second pixel, and the third pixel is input earlier than the fourth pixel sharing the color differences U3 and V3 and therefore the third pixel serves as the reference pixel. Then, "1" is generated as the notification signal to execute the color calculation processing. The fourth and subsequent pixels are processed in the same manner.

Description will be given for the case where input is performed in the order shown in FIG. 7 in the YUV420 format of FIG. 35(b) as an example when the image format is YUV420. The color differences U1 and V1 are shared among the first pixel, the second pixel, the fifth pixel and the sixth pixel. Subsequently, the third, fourth, seventh and eighth pixels; the ninth, tenth, thirteenth and fourteenth pixels; and the eleventh, twelfth, fifteenth and sixteenth pixels share the color differences, respectively. Pixels sharing the color differences are continuously input in the horizontal direction in the order of the first pixel, the second pixel, the third pixel, the fourth pixel, the fifth pixel, the sixth pixel, the seventh pixel, the eighth pixel, the ninth pixel, . . . and the sixteenth pixel for processing.

When the first pixel is input, between the first pixel and the second pixel that share the color differences U1 and V1, the first pixel that is input earlier serves as the reference pixel. Then, "1" is generated as the notification signal to execute the color calculation processing.

Next, when the second pixel is input, between the first pixel and the second pixel that share the color differences U1 and V1, the second pixel that is input later serves as the shared pixel. Then, "0" is generated as the notification signal, and the color judgment result of the first pixel that is the reference pixel is used for the color judgment result of the second pixel that is the shared pixel.

Next, when the third pixel is input, the color differences U3 and V3 of the third pixel are not shared with the second pixel having the color differences U1 and V1, and the third pixel is input earlier than the fourth pixel sharing the color differences U3 and V3 and therefore the third pixel serves as the reference pixel. Then, "1" is generated as the notification signal to execute the color calculation processing. The fourth pixel is processed in the same manner as the second pixel.

Next, when the fifth pixel is input, the color differences U1 and V1 of the fifth pixel are not shared with the color differences U3 and V3 of the fourth pixel, and the fifth pixel is input earlier than the sixth pixel sharing the color differences U1 and V1 and therefore the fifth pixel serves as the reference pixel. Then, "1" is generated as the notification signal to execute the color calculation processing. The sixth and subsequent pixels are processed in the same manner.

Figure 24:
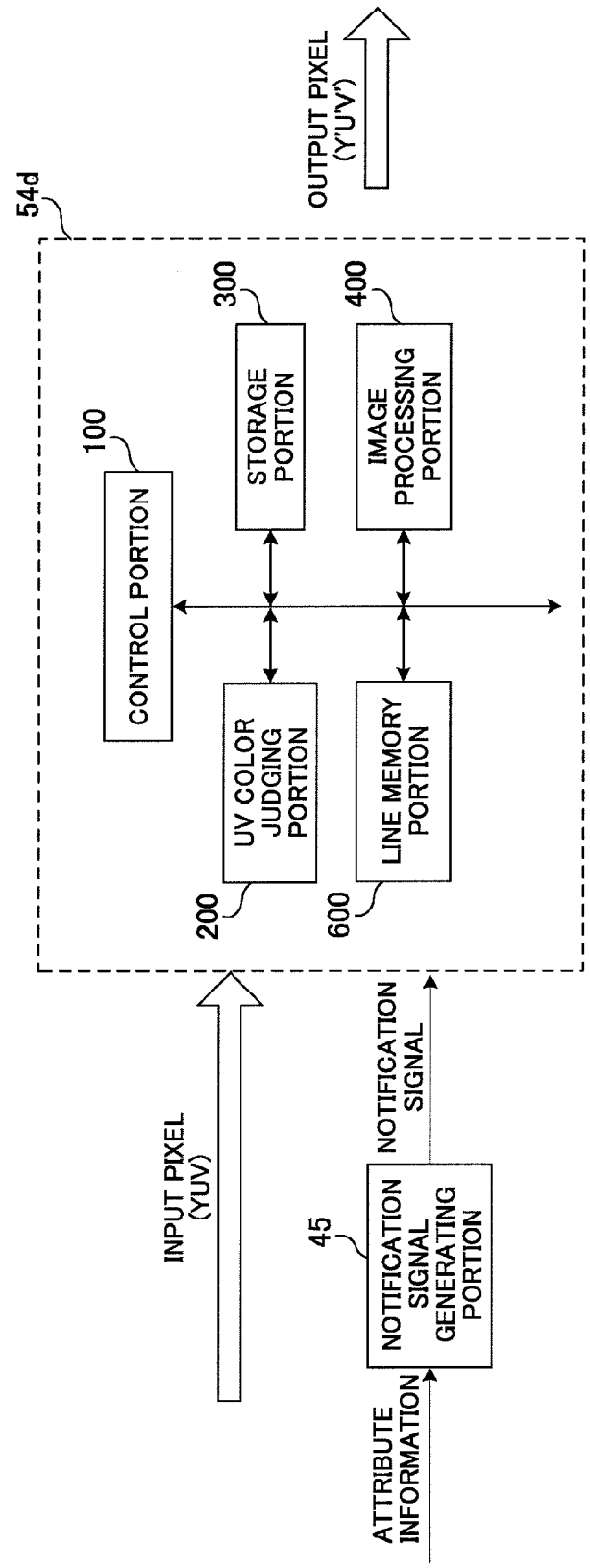
FIG. 24 is a view for describing a functional configuration of a high-speed image processing portion in a fourth embodiment.

Description will be given for the case where input is performed in the order shown in FIG. 7 in the YUV420 format of FIG. 35(b) and a line memory 600 that stores a color judgment result is used as shown in FIGS. 24 and 25, as a second example when the image format is YUV420. Note that, the embodiment with FIGS. 24 and 25 will be described below.

The color differences U1 and V1 are shared among the first pixel, the second pixel, the fifth pixel and the sixth pixel. Subsequently, the third, fourth, seventh and eighth pixels; the ninth, tenth, thirteenth and fourteenth pixels; and the eleventh, twelfth, fifteenth and sixteenth pixels share the color differences, respectively. Pixels sharing the color differences are continuously input in the horizontal direction in the order of the first pixel, the second pixel, the third pixel, the fourth pixel, the fifth pixel, the sixth pixel, the seventh pixel, the eighth pixel, the ninth pixel, . . . and the sixteenth pixel for processing.

When the first pixel is input, between the first pixel and the second pixel that share the color differences U1 and V1, the first pixel that is input earlier serves as the reference pixel. Then, "1" is generated as the notification signal to execute the color calculation processing. Here, an address for storing the color judgment result of the reference pixel in the line memory is x/2 (wherein, figures below the decimal point are omitted). The pixel position of the first pixel is at x=0, y=0, thus storing in the address 0 (=0/2) of the line memory.

Next, when the second pixel is input, between the first pixel and the second pixel that share the color differences U1 and V1, the second pixel that is input later serves as the shared pixel. Then, "0" is generated as the notification signal, and the color judgment result of the first pixel that is the reference pixel is used for the color judgment result of the second pixel that is the shared pixel.

Next, when the third pixel is input, the color differences U3 and V3 of the third pixel are not shared with the color differences U1 and V1 of the second pixel, and the third pixel is input earlier than the fourth pixel sharing the color differences U3 and V3 and therefore the third pixel serves as the reference pixel. Then, "1" is generated as the notification signal to execute the color calculation processing. The calculated color judgment result is stored in the line memory. The pixel position of the third pixel is at x=2, y=0, thus storing in the address 1 (=2/2) of the line memory. The fourth pixel is processed in the same manner as the second pixel.

Next, when the fifth pixel is input, the color differences U1 and V1 of the fifth pixel are shared with the color differences U1 and V1 of the first pixel that is the reference pixel, so that the fifth pixel that is input later serves as the shared pixel. Then, the pixel position of the fifth pixel is at x=0, y=1, so that the color judgment result of the first pixel that is the reference pixel stored in the address 0 (=0/2) of the line memory is used for the color judgment result of the fifth pixel that is the shared pixel.

Next, when the sixth pixel is input, the color differences U1 and V1 of the sixth pixel are shared with the color differences U1 and V1 of the first pixel that is the reference pixel, so that the sixth pixel that is input later serves as the shared pixel. Then, the pixel position of the sixth pixel is at x=1, y=1, so that the color judgment result of the first pixel that is the reference pixel stored in the address 0 (=½, figures below the decimal point are omitted, thus 0) of the line memory is used for the color judgment result of the sixth pixel that is the shared pixel. The seventh pixel is processed in the same manner as the fifth pixel, and eighth pixel is processed in the same manner as the sixth pixel.

Next, when the ninth pixel is input, the color differences U9 and V9 of the ninth pixel are not shared with the color differences U3 and V3 of the eighth pixel, and the ninth pixel is input earlier among the ninth, tenth, thirteenth and fourteen pixels that share the color differences U9 and V9 and therefore the ninth pixel serves as the reference pixel. Then, "1" is generated as the notification signal to execute the color calculation processing. The pixel position of the ninth pixel is at x=0, y=2 and the color judgment result is therefore stored in the address 0 (=0/2) of the line memory. The tenth and subsequent pixels are processed in the same manner.

Description will be given for the case where pixels are input in the order shown in FIG. 33 in the YUV420 format of FIG. 35(b), as a third example when the image format is YUV420. Pixels sharing the color differences are continuously input in the order of the first pixel, the fifth pixel, the second pixel, the sixth pixel, the third pixel, the seventh pixel, the fourth pixel, the eighth pixel, the ninth pixel, the thirteenth pixel, . . . and the sixteenth pixel for processing.

When the first pixel is input, among the first, second, fifth and sixth pixels that share the color differences U1 and V1, the first pixel that is input earlier serves as the reference pixel. Then, "1" is generated as the notification signal to execute the color calculation processing.

Next, when the fifth pixel is input, among the first, second, fifth and sixth pixels that share the color differences U1 and V1, the fifth pixel that is input later than the first pixel that is the reference pixel serves as the shared pixel. Then, "0" is generated as the notification signal, and the color judgment result of the first pixel that is the reference pixel is used for the color judgment result of the fifth pixel that is the shared pixel. Next, the second pixel and the sixth pixel are input sequentially, which are processed as the shared pixels in the same manner as the fifth pixel.

Next, when the third pixel is input, the color differences U3 and V3 of the third pixel are not shared with the sixth pixel having the color differences U1 and V1, and the third pixel is input earlier than the third, fourth, seventh and eighth pixels that share the color differences U3 and V3 and therefore the third pixel serves as the reference pixel. Then, "1" is generated as the notification signal to execute the color calculation processing. The seventh, fourth and eighth pixels are input sequentially, which are processed as the shared pixels in the same manner as the fifth, second and sixth pixels.

Next, when the ninth pixel is input, the color differences U9 and V9 of the ninth pixel are not shared with the eighth pixel having the color differences U3 and V3, and the ninth pixel is input earlier among the ninth, tenth, thirteenth and fourteenth pixels that share the color differences U9 and V9 and therefore the ninth pixel serves as the reference pixel. Then, "1" is generated as the notification signal to execute the color calculation processing. The thirteenth and subsequent pixels are processed in the same manner.

Moreover, when the attribute is "3" in the attribute 5 "enlargement" and the attribute is "2" in the attribute 6 "magnification", it is shown that image data is an image that is enlarged three times in the lateral direction. Here, when the enlargement is performed with the nearest neighbor method by algorithm for enlargement, the first pixel serves as the reference pixel, and the second pixel and the third pixel have the same pixel value as that of the first pixel and are therefore judged as the shared pixels.

When no necessary attribute information is input at step S1202 (step S1202; No), luminance distribution (histogram) is created from image data (step S1208). Then, the image format is identified from the generated luminance distribution (step S1210).

As an example, in the generated luminance distribution, when a count value (number of pieces) of each luminance is a multiple of two, it is identified as the format of YUV422, and in the case of a multiple of four, it is identified as the format of YUV420.

Then, based on the image format identified at step S1210, judgment of a shared pixel is performed (step S1212).

Subsequently, whether or not the current pixel is included in an area for performing color judgment (color judgment area) is judged (step S1214). Here, when the current pixel is in the area for performing color judgment, whether or not the current pixel is the shared pixel is judged (step S1214; Yes→step S1216).

When the current pixel is the shared pixel, "0" is generated and output as the notification signal nos (step S1218). On the other hand, when the current pixel is not included in the color judgment area (step S1214; No) or is not the shared pixel (step S1216; No), "1" is generated and output as the notification signal nos (step S1220).

Note that, when separately from a pixel value of a pixel, attribution information is input being added for each pixel with the pixel value, the attribution information added to the pixel may be judged to determine the reference pixel or the shared pixel.

[1.3.3 Color Judgment Processing]

Figure 14:
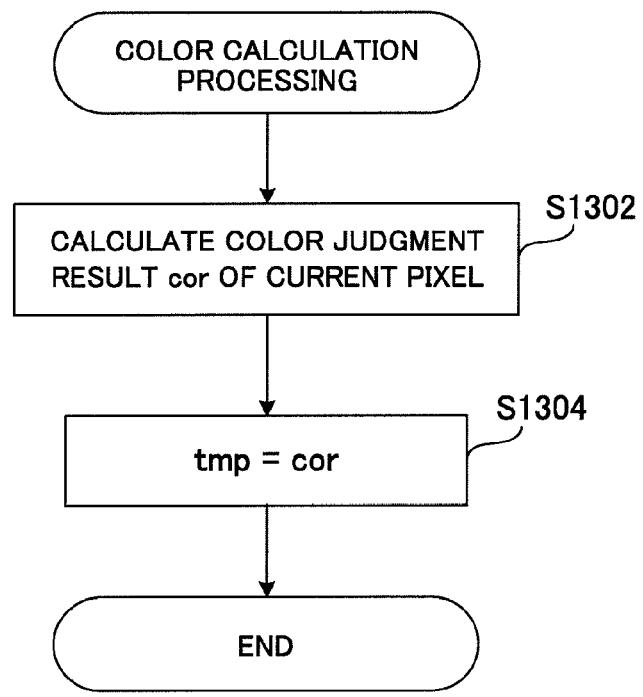
FIG. 14 is a view for describing color judgment processing in the first embodiment.

Next, description will be given for the color judgment processing with FIG. 11 and FIG. 14. First, whether or not the notification signal nos is "1" is judged (step S1250 of FIG. 11). Here, when the notification signal nos is "1", the color calculation processing (step S1300 of FIG. 11) is executed and a color judgment result cor about the current pixel is calculated (step S1302 of FIG. 14).

Here, the color judgment result cor is able to be expressed in the range of "0" to "1" by normalization (note that, in the case of expressing by 8 bits, it may be expressed as "0" to "255"). The color judgment result cor calculated at step S1302 is then stored in a variable number tmp as the color judgment result of the reference pixel (step S1304 of FIG. 14).

The color calculation processing is processing of calculating and judging color of the current pixel from the pixel value of the current pixel. For example, processing is performed such that a range of each pixel value corresponding to color for which color judgment is desirably performed (specified color) is defined in advance, and when the pixel value of the current pixel is included in the range, it is judged as that color (specified color). In the present embodiment, a pixel value of color which is most likely to be the specified color (hereinafter, this pixel is referred to as a specified color pixel) is defined, and pixels included in a fixed range is judged as the specified color from the specified color pixel.

For example, the case where the pixel value of the current pixel matches the pixel value of the specified color pixel is set as the color judgment result cor="1" and the case of being not included in the specified color range is set as cor="0", so that the color judgment result cor is defined so that the color judgment result cor approaches from "1" to "0" as approaching out of the range of the specified color from the specified color pixel. For example, the color judgment result cor is calculated by the following formula.

$$cor = \{Rn - \min(Dis, Rn)\}/Rn$$

$$Dis = |Ui - Us| + |Vi - Vs|$$

Here, Rn is a range (radius) corresponding to the specified color, and min(X, Y) is a function that returns a smaller value between X and Y. Dis is so called Manhattan Distance of the specified pixel value and the current pixel value, Ui and Vi are color difference values of the current pixel, and Us and Vs are color difference values of the specified color pixel.

In addition, the Euclidean distance or distance using ellipse may be calculated as a method for calculating Dis. When cor calculation with higher accuracy is performed, the processing time for the color calculation processing is increased, but it becomes possible to execute the color judgment processing at high speed by the present embodiment.

Figure 11:
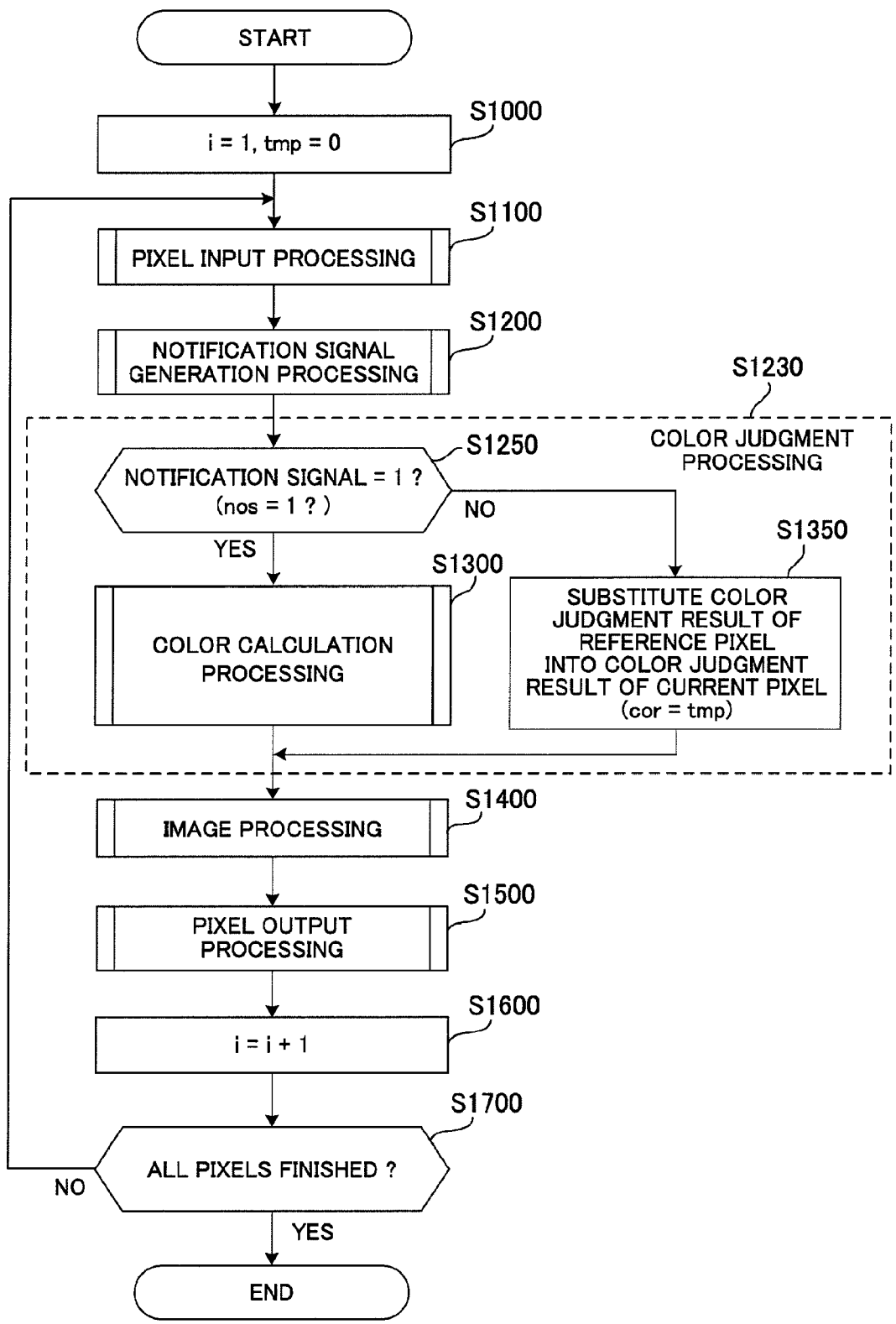
FIG. 11 is a view for describing a processing flow in the first embodiment.

On the other hand, when the notification signal nos is "0" (step S1250 of FIG. 11; No), a value of tmp storing the color judgment result of the reference pixel is substituted into the color judgment result cor as the color judgment result of the current pixel (step S1350 of FIG. 11).

In this manner, according to the present processing, it is only when the notification signal nos is "1" that the color calculation processing is performed.

[1.3.4 Image Processing]

Figure 15:
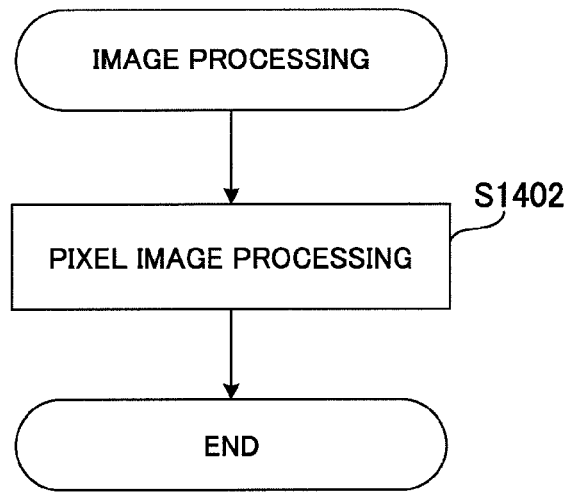
FIG. 15 is a view for describing image processing in the first embodiment.

Next, description will be given for the image processing with FIG. 15. That is, various image processing is executed based on the color judgment result cor (step S1402).

As described above, the value "1" of the color judgment result cor shows being the specified color that is most likely to the specific color (specified color) and "0" shows being not the specified color. The values of "0" to "1" are values showing a degree of similarity to the color corresponding to the specified color pixel, and by using a color judgment result thereof for the image processing, the image processing is to be performed in accordance with the degree of similarity corresponding to the color that is most likely to the specified color. As an example of the image processing, for example, the following processing is considered.

(1) Processing of adjusting luminance is executed in accordance with the color judgment result cor. As the color judgment result cor approaches "1", the luminance is largely increased, and in the case of "0", the luminance value is not changed.

(2) A sharpening parameter is adjusted in accordance with the color judgment result cor. When the color judgment result cor is "1", the sharpening parameter is reduced so that sharpening is not performed, and in the case of "0", the sharpening parameter is increased to perform sharpening. Here, the sharpening processing itself may be performed at the external image correcting portion 56 or the like, or the sharpening processing may be performed for the current pixel by obtaining a value of a surrounding pixel of the current pixel.

(3) The color difference is adjusted in accordance with the color judgment result cor. When the color judgment result is "1", saturation enhancement of the color difference is suppressed, and in the case of "0", saturation enhancement of the color difference is performed.

Thereby, it is possible to obtain the following advantages, for example, when skin color is judged as the specified color and the image processing is executed.

In (1), the skin color of a person becomes bright and other color does not become bright, that is, storage color correction is to be performed.

In (2), the skin of a person is not sharpened so that sharpening is to be performed without emphasizing noise.

In (3), the skin of a person becomes brilliant while being prevented from being reddish, that is, storage color correction is to be performed.

[1.3.5 Pixel Output Processing]

Figure 16:
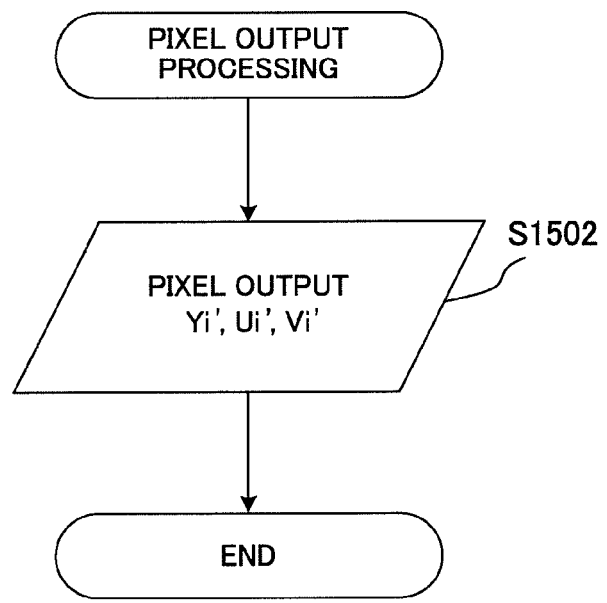
FIG. 16 is a view for describing pixel output processing in the first embodiment.

Next, description will be given for the pixel output processing with FIG. 16. In the pixel output processing, for the pixel subjected to the image processing, each of Yi', Ui' and Vi' is output (step S1502).

In this manner, according to the first embodiment, it becomes possible to execute the color judgment processing at high speed for image data shown in the color space of YUV.

This is effective for various image formats in which luminance and brightness are managed as independent attribute values, including YUV422, YUV420, YUV411 and YUV9, and becomes highly effective processing, in particular, for the case of a moving image where it is necessary to apply the image processing at high speed.

That is, for the pixel that has a different luminance value but shares the color difference value, as the shared pixel, the color judgment result of the reference pixel is to be used. Since the reference pixel and the shared pixel have the same color difference value, there is an advantage that speed of the processing is able to be increased without lowering accuracy of the color judgment result.

2. Second Embodiment

Subsequently, the second embodiment will be described. The second embodiment describes the case where image processing is performed, maintaining the RGB space, for image data using the RGB format in the color space. Note that, constituent elements, processing and the like that are the same as those of the above-described first embodiment will be given the same reference numerals so as to omit detailed description thereof.

[2.1 Functional Configuration]

Figure 17:
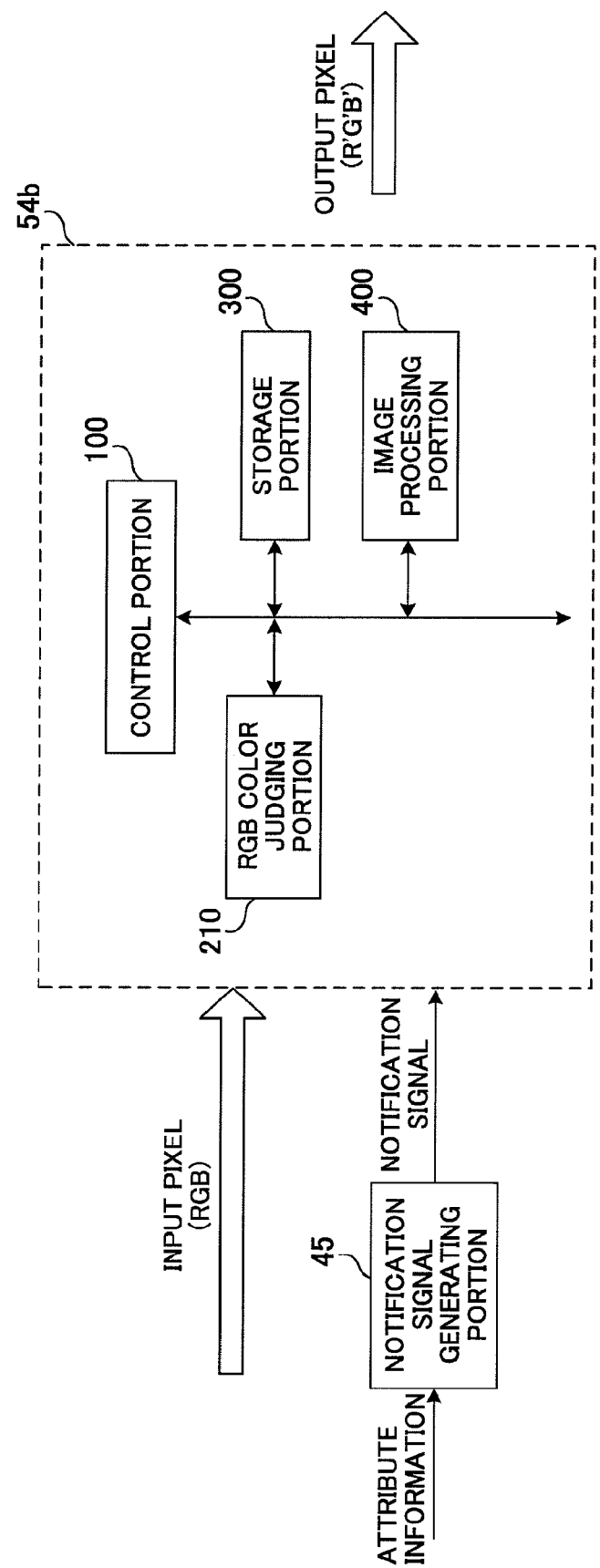
FIG. 17 is a view for describing a functional configuration of a high-speed image processing portion in a second embodiment.

First, description will be given for a high-speed image processing portion 54b of the second embodiment with FIG. 17. This high-speed image processing portion 54b is a functional portion, and replaces the high-speed image processing portion 54 in FIG. 2 (FIG. 6) of the first embodiment.

In the high-speed image processing portion 54b, an RGB color judging portion 210, a storage portion 300 and an image processing portion 400 are connected to a control portion 100. Moreover, in the present embodiment, to the high-speed image processing portion 54b, a pixel (RGB) constituting an input image is input, and after being subjected to the image processing, a pixel (R'G'B') is output. Further, in the present embodiment, notification signal is input from a notification signal generating portion 45.

Figure 18:
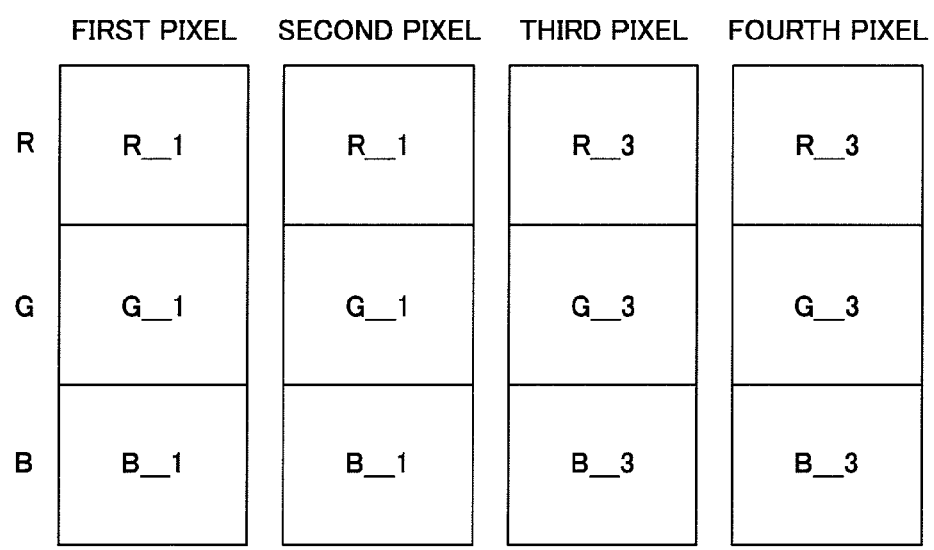
FIG. 18 is a view for describing an operation of a color judging portion in the second embodiment.

The RGB color judging portion 210 is a functional portion for executing color judgment in each pixel. In the present embodiment, description will be given as color judgment is performed based on a color space of RGB. Here, FIG. 18 is a view schematically showing pixels (first pixel to fourth pixel). A pixel value of each pixel is expressed by an RGB value showing each value of RGB (hereinafter, for example, an R value refers to a value of R). Here, each value is able to be expressed in the range of "0" to "1" by normalization. Note that, in the case of expressing by 8 bits, it is possible to express as "0" to "255". In the following embodiment, description will be given with the case of expressing by "0" to "255".

The operation of the RGB color judging portion 210 and the notification signal generating portion 45 will be described with FIG. 19. For example, in the case of an image that is enlarged twice in the lateral direction by the nearest neighbor method, every two pixel is configured by the same pixel (with the same RGB value). Accordingly, the notification signal generating portion 45 judges the odd-number pixel as the reference pixel and the even-number pixel as the shared pixel. Moreover, in the case of the odd-number pixel, the notification signal nos is output as "1", and in the case of the even-number pixel, the notification signal nos is output as "0".

Thereby, the color calculation processing (color calculation 1 and color calculation 3) is executed for the odd-number pixels such as the first pixel and the third pixel, and the color calculation processing is not executed for the even-number pixels such as the second pixel and the fourth pixel.

[2.2 Processing Flow]

Figure 20:
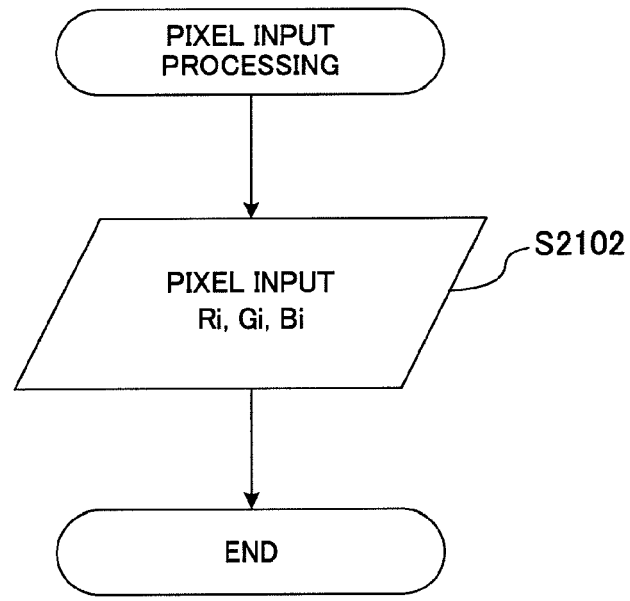
FIG. 20 is a view for describing pixel input processing in the second embodiment.
Figure 21:
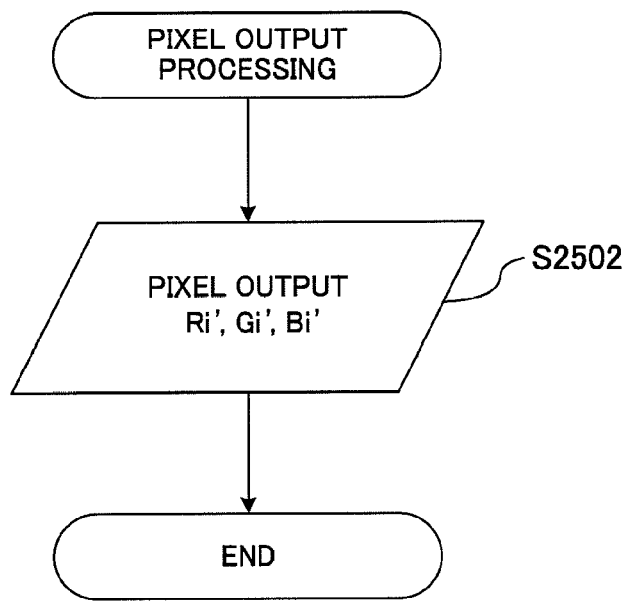
FIG. 21 is a view for describing pixel output processing in the second embodiment.

Subsequently, description will be given for a processing flow of the high-speed image processing portion 54b in the present embodiment. Note that, the processing becomes such that step S1102 of the pixel input processing of FIG. 12 in the first embodiment is replaced with step S2102 of FIG. 20 where pixel values input (read) as pixel values are Ri, Gi and Bi, and step S1502 of the pixel output processing of FIG. 16 in the first embodiment is replaced with step S2502 of FIG. 21 where pixel values that are output are Ri, Gi and Bi.

In this manner, according to the second embodiment, it becomes possible to execute the color judgment processing at high speed in the image data shown by the color space of RGB.

The color calculation processing is processing of judging color of the current pixel (determining what color the current pixel has). For example, using a relation of magnitude of RGB values of an input pixel, an area of color of the current pixel is judged. Then, from the relation of magnitude, the color judgment result cor is determined by a table of FIG. 34.

Figure 19:
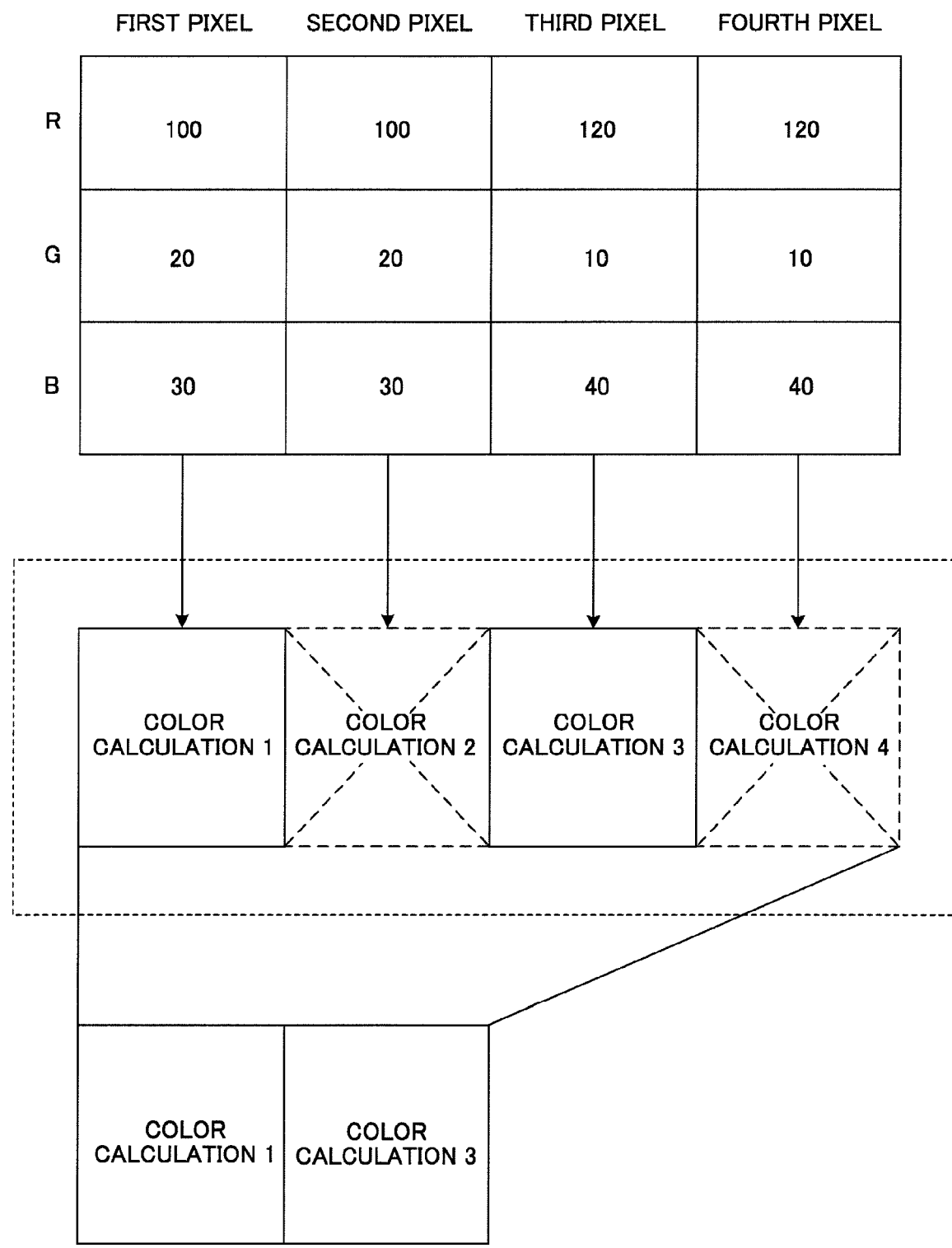
FIG. 19 is a view for describing an operation of the color judging portion in the second embodiment.

For example, the case of R=100, G=20 and B=30 in the first pixel of FIG. 19 becomes R>B>G, so that the current pixel is judged as being magenta and "5" is output as the color judgment result cor.

3. Third Embodiment

Subsequently, the third embodiment will be described. The third embodiment describes the case where image data that is input and output has the color space of RGB when a high-speed image processing portion processes image data using the YUV format. Note that, constituent elements, processing and the like that are the same as those of the above-described first embodiment will be given the same reference numerals so as to omit detailed description thereof.

[3.1 Functional Configuration]

Figure 22:
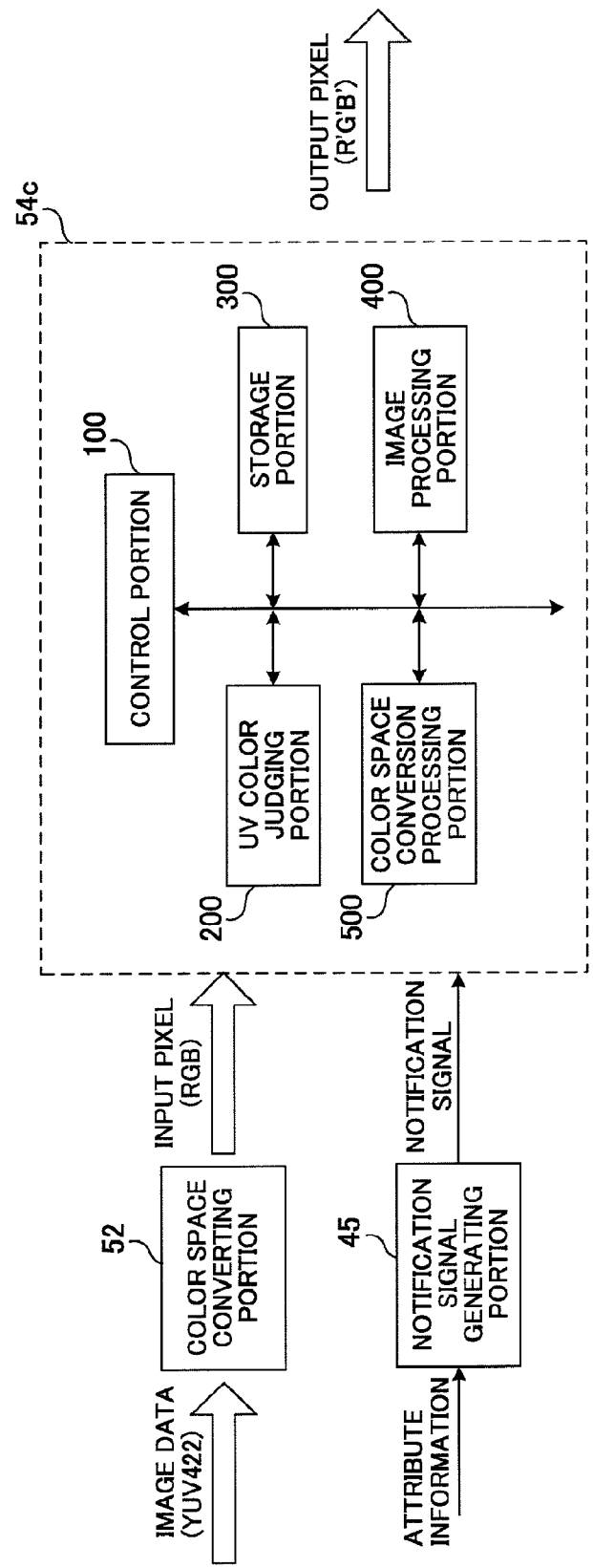
FIG. 22 is a view for describing a functional configuration of a high-speed image processing portion in a third embodiment.

First, description will be given for a high-speed image processing portion 54c of the third embodiment with FIG. 22. This high-speed image processing portion 54c is a functional portion, and replaces the high-speed image processing portion 54 in FIG. 2 (FIG. 6) of the first embodiment.

In the high-speed image processing portion 54c, a UV color judging portion 200, a storage portion 300, an image processing portion 400 and a color space conversion processing portion 500 are connected to a control portion 100. Moreover, in the present embodiment, pixel values of RGB are input as input data to the high-speed image processing portion 54c, and after being subjected to image processing, pixel values of R'G'B' are output from the high-speed image processing portion 54c.

The color space conversion processing portion 500 is a functional portion that converts the input pixel in the RGB format to the pixel in the YUV format or converts the pixel in the YUV format to the pixel in the RGB format and outputs it. That is, since the color space is converted by the color space conversion processing portion 500, appropriate processing is able to be executed for any image formats. For example, it is possible to convert the color space with the conversion formula similar to that of the above-described color space converting portion 52.

Note that, in the present embodiment, the high-speed image processing portion 54c inputs and outputs image data in the RGB format, so that image data (YUV422 format) is converted to image data in the RGB format at the color space converting portion 52.

Figure 23:
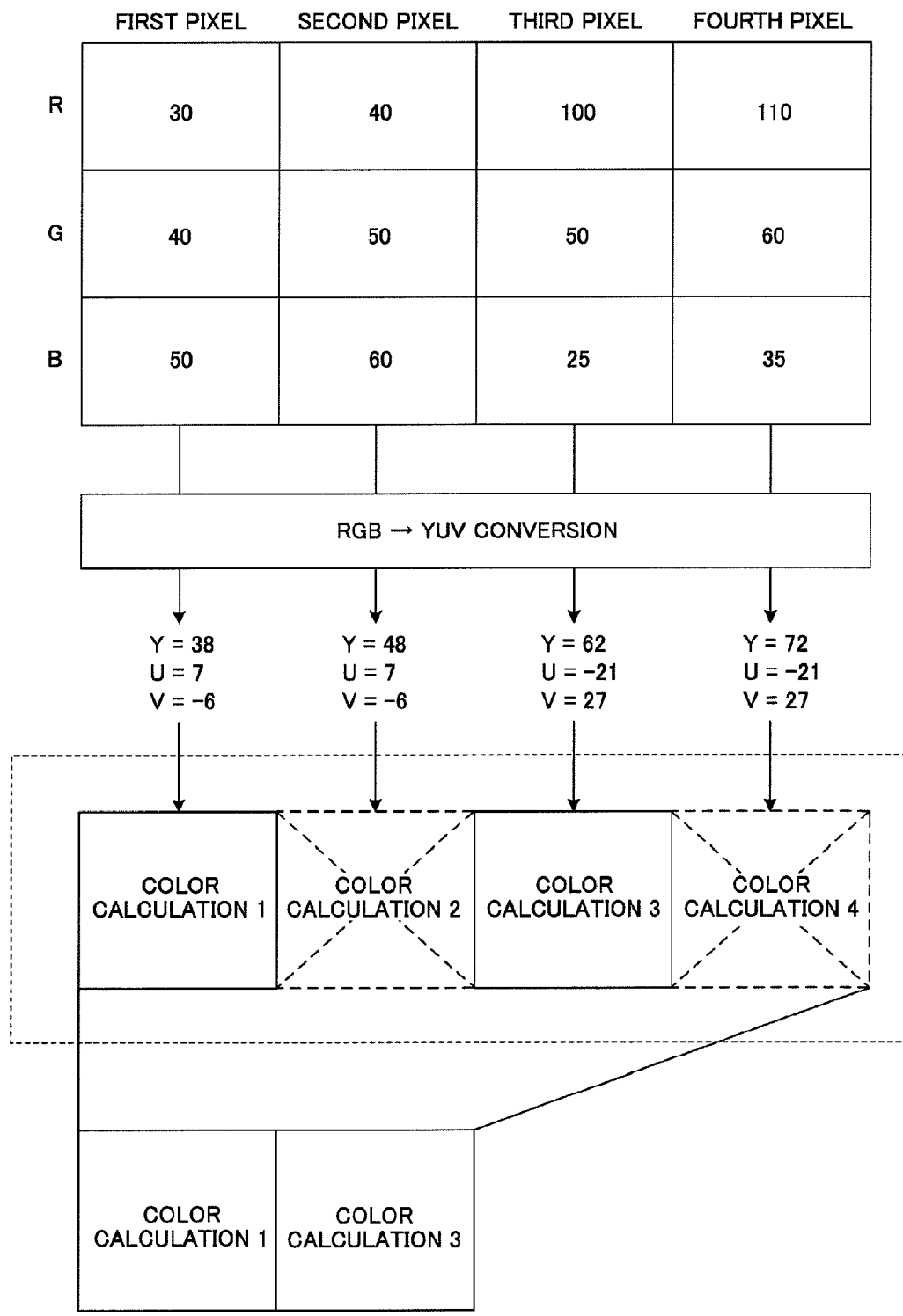
FIG. 23 is a view for describing an operation of the third embodiment.

In addition, a notification signal generating portion 45 judges a reference pixel and a shared pixel based on a color difference value of YUV422 to generate notification signal. FIG. 23 is a view for schematically describing the present embodiment. That is, with pixel values of RGB, it is impossible to judge the reference pixel and the shared pixel, but it is possible to appropriately process even image data of the color space of RGB by converting to the color space of YUV once or judging with the color space of YUV when generating the notification signal.

Specifically, the first pixel of FIG. 23 with "R=30, G=40, B=50" and the second pixel with "R=40, G=50, B=60" do not have a relation of the reference pixel and the shared pixel. However, by converting to the color space of YUV, the first pixel has "Y=38, U=7, V=−6" and the second pixel has "Y=48, U=7, V=−6". Here, the first pixel and the second pixel have the same color differences U and V and are therefore processed as having the relation of the reference pixel and the shared pixel.

In this manner, when converting to the YUV format once and judging as the shared pixel with the color differences U and V, the luminance Y is not considered, so that in the present embodiment, the present processing is applicable without considering brightness of an image even when the input image data is image data in the RGB format.

4. Fourth Embodiment

Subsequently, the fourth embodiment will be described. The fourth embodiment describes an embodiment in which by using a line memory portion 600, a color judgment result of a previous line is used when applying to the YUV420 format and the like. Note that, constituent elements, processing and the like that are the same as those of the above-described first embodiment will be given the same reference numerals so as to omit detailed description thereof.

[4.1 Functional Configuration]

First, description will be given for a high-speed image processing portion 54d of the fourth embodiment with FIG. 24. This high-speed image processing portion 54d is a functional portion, and replaces the high-speed image processing portion 54 in FIG. 2 (FIG. 6) of the first embodiment.

In the high-speed image processing portion 54d, a UV color judging portion 200, a storage portion 300, an image processing portion 400 and a line memory portion 600 are connected to a control portion 100. Moreover, in the present embodiment, pixels (YUV) are input as input data to the high-speed image processing portion 54d, and after being subjected to image processing, pixels (Y'U'V') are output from the high-speed image processing portion 54d.

FIG. 25 is a view for describing the line memory portion 600. FIG. 25(a) is a view showing condition of arrangement of pixels in image data, and FIG. 25(b) is a view showing a general outline of the line memory portion 600.

As shown in FIG. 25(b), the line memory portion 600 is a memory area for storing a color judgment result calculated in a previous line. As an example, in the case of YUV420, an area with a ½ size of an image lateral size for performing color judgment processing is secured.

As shown in FIG. 25, when the lateral direction is 1920 pixels, the half area thereof for 960 pixels is secured. Then, odd-number pixels including the first pixel, the third pixel, the fifth pixel . . . are stored as the color judgment result of the reference pixel.

In addition, the color judgment result of the first pixel (reference pixel) is used as the subsequent second pixel that is the shared pixel, the 1921-th pixel and the 1922-th pixel in the next line being the shared pixels.

In this manner, according to the present embodiment, by using the line memory portion 600, it becomes possible to apply by judging the shared pixel not only for pixels consecutive in the horizontal direction (lateral direction) but also for pixels consecutive in the vertical direction (longitudinal direction).

5. Fifth Embodiment

Subsequently, the fifth embodiment will be described. The fifth embodiment describes the case where not only color calculation processing is not performed for shared pixels as shown in the above-described embodiment, but also image processing (that is, such processing that changes color) is not performed for shared pixels. Note that, constituent elements, processing and the like that are the same as those of the above-described first embodiment will be given the same reference numerals so as to omit detailed description thereof.

[5.1 Functional Configuration]

Figure 26:
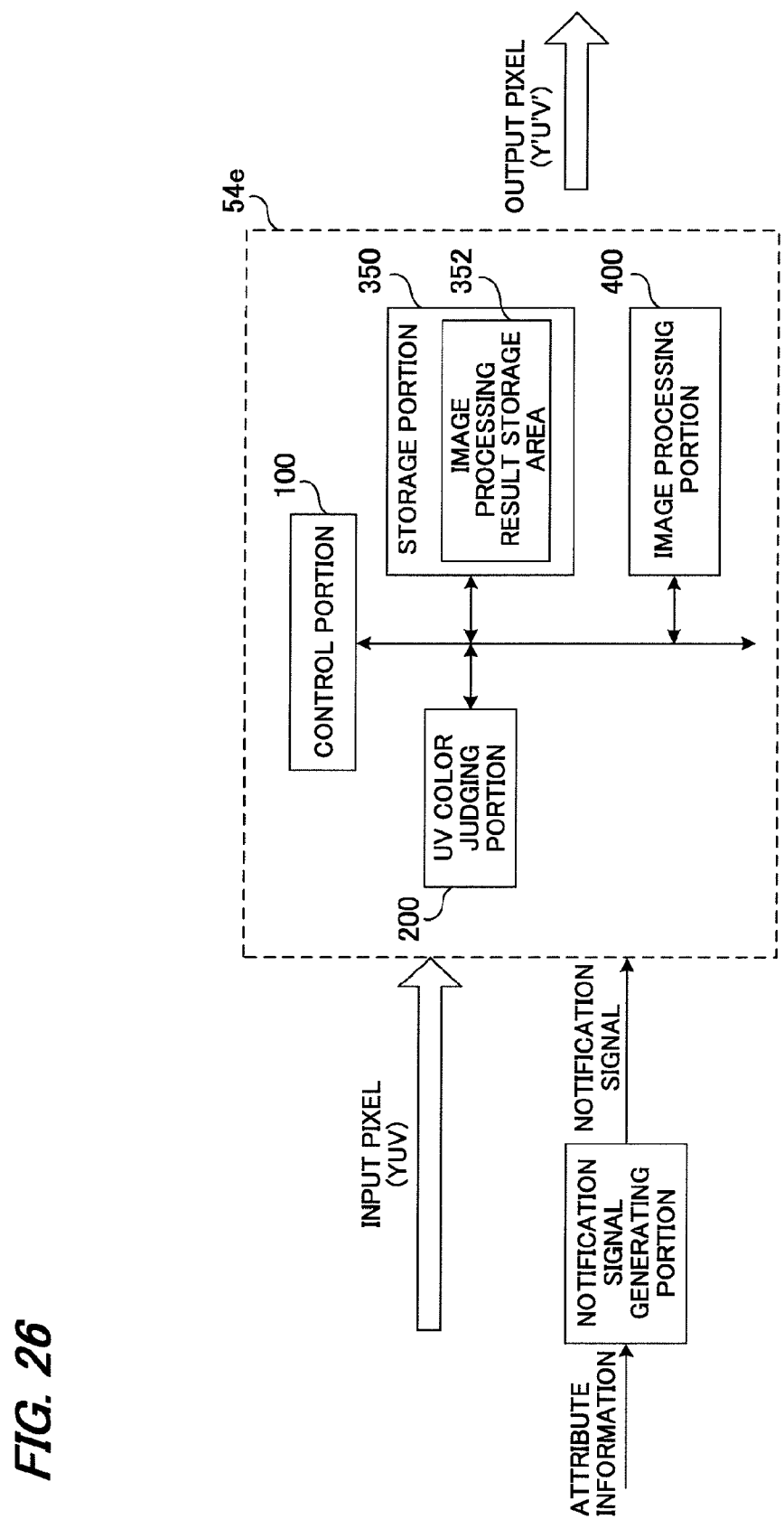
FIG. 26 is a view for describing a functional configuration of a high-speed image processing portion in a fifth embodiment.

First, description will be given for a high-speed image processing portion 54e of the fifth embodiment with FIG. 26. This high-speed image processing portion 54e is a functional portion, and replaces the high-speed image processing portion 54 in FIG. 2 (FIG. 6) of the first embodiment.

In the high-speed image processing portion 54e, a UV color judging portion 200, a storage portion 350 and an image processing portion 400 are connected to a control portion 100. Moreover, in the present embodiment, pixels (YUV) are input as input data to the high-speed image processing portion 54e, and after being subjected to image processing, pixels (Y'U'V') are output from the high-speed image processing portion 54e.

The storage portion 350 secures an image processing result storage area 352 as a storage area. In this image processing result storage area 352, an image processing result about such image processing that changes color is stored, and the result of this image processing is to be applied to shared pixels.

[5.2 Processing Flow]

Subsequently, description will be given for a processing flow of the high-speed image processing portion 54e in the present embodiment with FIG. 27. In addition, processing (step S1250, step S5300 and step S5350) surrounded by a dotted line in the drawing is set as color judgment processing.

First, each variable number is initialized (step S5000). Here, a variable number i denotes a pixel (1 to WH). The tmp is a variable number storing a color judgment result of the reference pixel. The tmpUout and tmpVout (=0) are variable numbers storing each of a U value and a V value of the pixel value of the reference pixel. By initialization, it is set such that i=1, tmp=0, tmpUout=0 and tmpVout=0.

Figure 27:
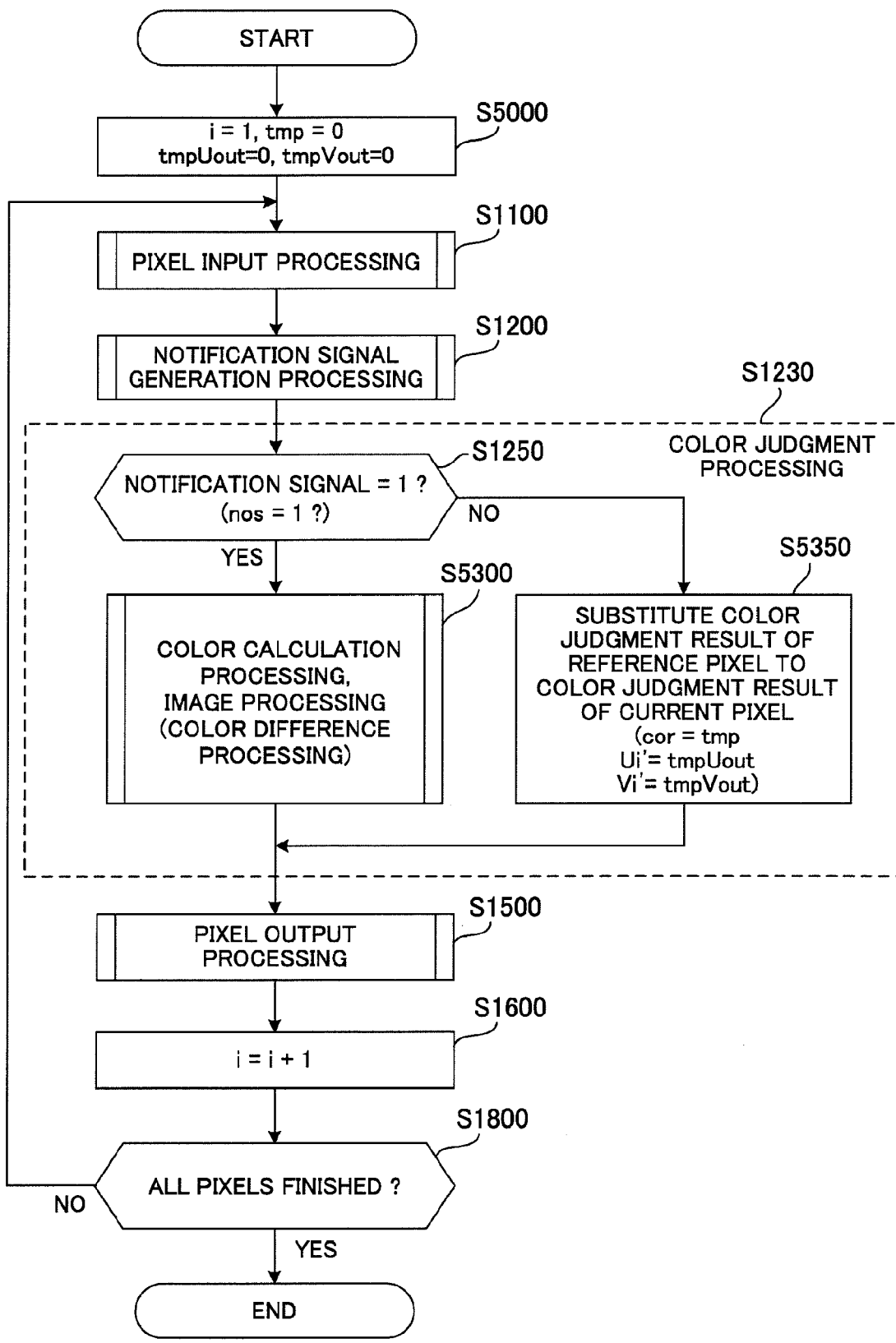
FIG. 27 is a view for describing a processing flow in the fifth embodiment.
Figure 28:
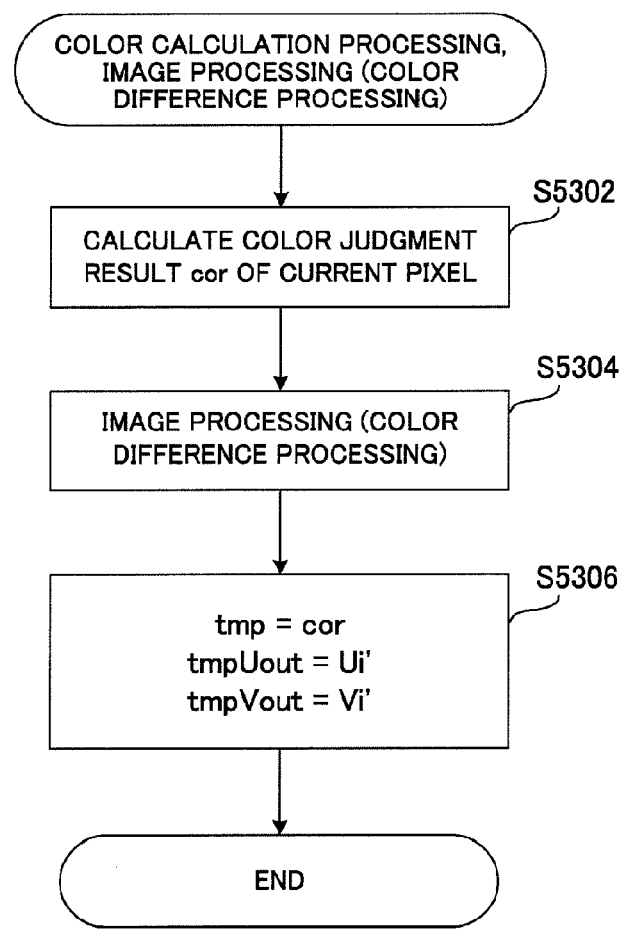
FIG. 28 is a view for describing an operation in the fifth embodiment.

Note that, processing of FIG. 27 is configured such that step S1300 that is the color calculation processing and step S1400 that is the image processing are replaced with step S5300, and step S1350 that is a process of substituting the color judgment result of the reference pixel into the color judgment result of the current pixel is replaced with step S5350 in the processing of FIG. 11. Thus, description will be given for the color calculation processing and the image processing of step S5300, and the processing of substituting the color judgment result of the reference pixel into the color judgment result of the current pixel of step S5350, that are characteristics of the embodiment, with FIG. 28.

First, when the notification signal is "1", the color calculation processing and the image processing are performed. First, the color judgment result cor of the current pixel is calculated (step S5302).

Subsequently, the image processing is applied to the current pixel (here, the reference pixel) (step S5304). The image processing applied here is executed for such color difference processing that changes color. Then, the color judgment result cor of the current pixel is stored in tmp to serve as the color judgment result of the reference pixel, and image processing results Ui' and Vi' of the current pixel are stored in tmpUout and tmpVout (image processing result storage area 352) as the image processing results of the reference pixel (step S5306).

On the other hand, when the notification signal is "0", the current pixel is the shared pixel, so that tmp in which the color judgment result of the reference pixel is stored as the color judgment result cor is substituted, and each of tmpUout and tmpVout that are the image processing results of the reference pixel is read from the image processing result storage area 352 and substituted into the output results Ui' and Vi' of the current pixel, respectively (step S5350).

In this manner, according to the fifth embodiment, not only the color calculation processing is not performed for the shared pixels but also the image processing is further not calculated and the image processing results of the reference pixel are used, thus allowing operation at higher speed.

6. Sixth Embodiment

Subsequently, the sixth embodiment will be described. Though description has been given in the above-described embodiments for the case of executing and the case of not executing the color calculation processing (the case of executing the color calculation processing only for odd-number pixels) in accordance with the notification signal input from the notification signal generating portion 45, for example, processing of judging different specified color may be executed.

Specifically, as shown in FIG. 29(a), it becomes possible that "skin color" is judged as a specified color for an odd-number pixel, and color other than skin color (for example, "sky blue color") is judged for an even-number pixel.

In this case, when the same color calculation is performed for each pixel, only one color is able to be judged with one color calculation processing, but with the configuration of the present embodiment, one color calculation processing is diverted so that judgment of a plurality of colors is made possible.

Conventionally, since various image processing is applied to a specified color, when judgment of a plurality of colors is made possible with one color calculation processing, effect of reducing a circuit size, in particular, when being constituted by a hardware circuit, is able to be expected.

Moreover, since it is possible to perform a plurality of color calculation in the same processing step, it is possible to reduce processing time correspondingly. For example, in the case of FIG. 29(b), processing has to be essentially performed twice for "skin color" and "sky blue color", but color calculation of two specified colors becomes possible with one-time processing, thus making it possible to expect an advantage that processing time is finished half.

7. Seventh Embodiment

Subsequently, the seventh embodiment will be described. In the present embodiment, other processing such as setting of an image quality mode in displaying on the display portion 60 and recording of a video may be performed instead of the image processing.

For example, a functional portion that makes the color judgment result (e.g.: 0-255, color is more likely to be skin color as the number becomes larger) into histogram is provided outside the high-speed image processing portion, so that the color judgment result judging as being skin color is made into histogram for one frame by the functional portion, and when the color judgment result is judged that one frame has 50% or more of pixels having a value of 200 or more, as being an image in which a person is captured, image quality mode setting of a mobile phone is set for persons through the control portion.

In addition, for example, what color the current pixel has is judged as the color judgment processing. In this case, a functional portion that makes distribution of the color judgment result cor (for example, "1" to "7") is provided outside the high-speed image processing portion, so that the color judgment result is made into distribution for one frame by the external functional portion. When it is judged that a value of "2" is in one frame, for example, 30% or more, as the value of the color judgment result cor, image quality mode setting of a mobile phone is set for natural images (for example, dynamic) through the control portion as being a scenery image in which grasses and mountains are captured.

Alternatively, when it is judged that a person is captured, the control portion 10 of a television mounted with a color judging apparatus of the present embodiment controls a recorder via the wireless communication portion 20 so as to cause the recorder connected to the television to automatically start recording of a video transmitted from the television.

In this manner, without performing the image processing, it is possible to use the color judgment result as a trigger for controlling a device.

Further, an initial value of a pixel value or color of the reference pixel may be a value obtained from a pixel of image data (calculated from a pixel of image data in the case of color) or may be a value defined separately from the image data. When defining separately from the image data, a value held by the color judging apparatus in advance or a value input from outside the color judging apparatus (for example, input via a communication function provided by the color judging apparatus) may be possible. In addition, pixel values of YUV, RGB and the like may be expressed with 0 to 1 by normalization.

8. Advantages

According to the above-described embodiments, by omitting the color calculation processing or the like for the shared pixel connected to the reference pixel of an input image, it is possible to execute high-speed color judgment processing. The high-speed image processing portion of the present embodiment is able to execute processing at high speed and with high accuracy compared to a conventional one without lowering accuracy of color judgment. In addition, since accuracy of color judgment is not lowered, as to a generated image, a more appropriate image is to be output.

Moreover, though in the above-described embodiments, the case where the shared pixel is one pixel has been described for convenience of description, for example, when there are three pixels of shared pixels like YUV420, processing time of the color calculation processing is able to be reduced to ¼, and when there are 15 pixels of shared pixels like YUV9, processing time of the color calculation processing is able to be reduced to ¹⁄₁₆.

In particular, when applying to an image format in which pixel values other than luminance are the same are stored, the luminance does not affect the color judgment, so that it becomes possible to reduce the number of times of the color calculation without lowering accuracy of the color judgment, thus making it possible to provide the color judging apparatus capable of operating at high speed and appropriately.

9. Modified Example

As described above, though the embodiments of the present invention have been described in detail with reference to the drawings, specific configurations are not limited to the embodiments and any design and the like in the scope without departing from the aspect of the present invention is also included in the scope of claims.

In addition, though description has been given for the case where the color judging apparatus is applied to a mobile phone or a television in the above-described embodiments, it is of course applicable to various display apparatuses such as a car navigation system and a computer.

Figure 30:
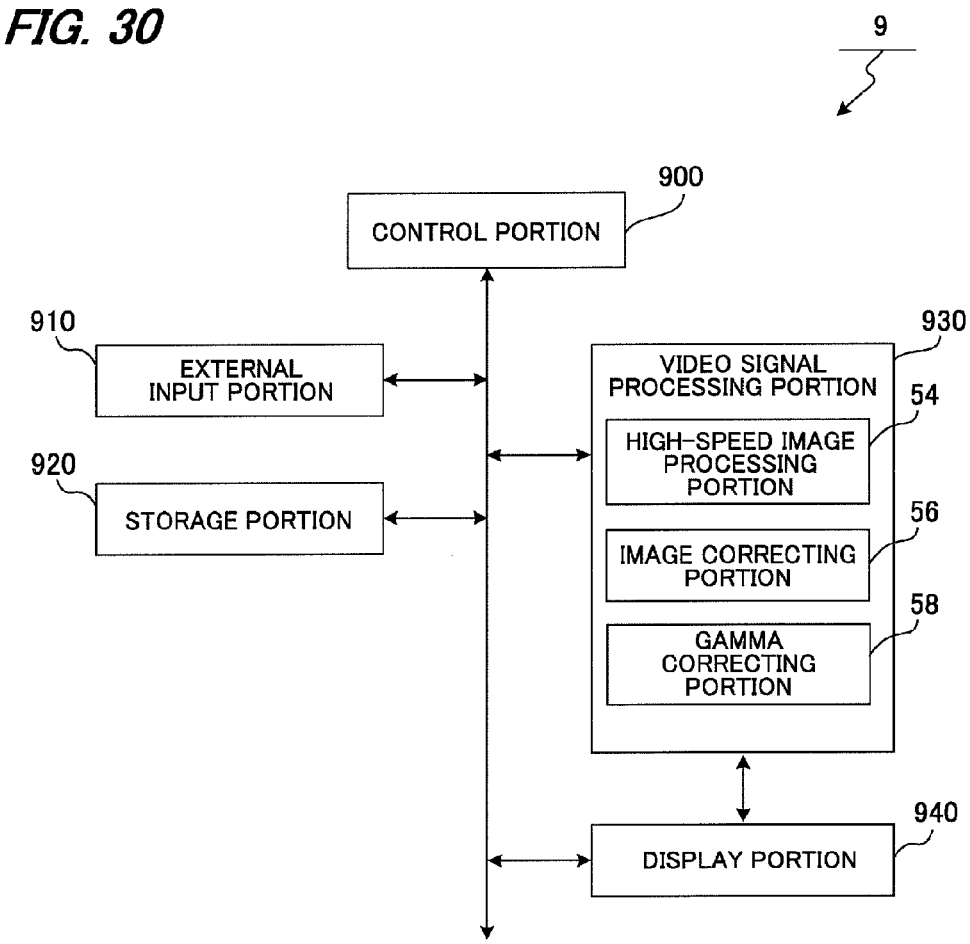
FIG. 30 is a view for describing a modified example in the present embodiment.

For example, description will be given taking a simple display apparatus 9 connected to a computer in FIG. 30 as an example. In the display apparatus 9, an external input portion 910, a storage portion 920, a video signal processing portion 930 and a display portion 940 are connected to a control portion 900. The video signal processing portion 930 includes the high-speed image processing portion 54, the image correcting portion 56 and the gamma correcting portion 58, to which the present invention is applied.

Here, video signal input by the external input portion 910 is displayed on the display portion 940 through the video signal processing portion 930. At this time, by being through the high-speed image processing portion 54, the display apparatus 9 is able to perform processing at higher speed.

In addition, it may be configured such that the high-speed image processing portion of the present embodiment further has a similarity judging portion that judges whether or not image data is similar so that the color judgment processing is not performed in the case of a similar pixel. Note that, the similar pixel refers to a pixel that a color difference value of a pixel judged as a reference pixel is included in a predetermined range (hereinafter, referred to as a "predetermined threshold").

Figure 31:
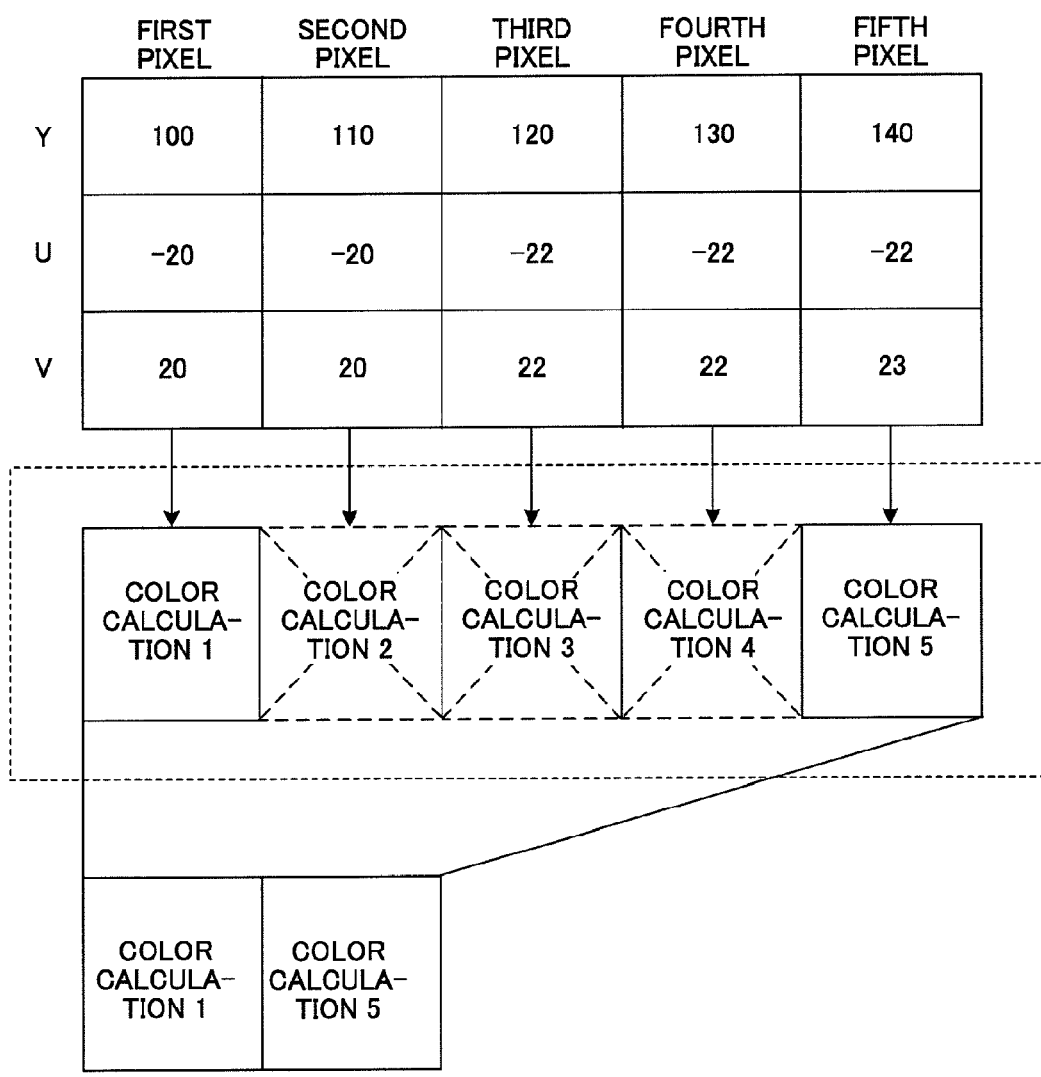
FIG. 31 is a view for describing the modified example in the present embodiment.
Figure 32:
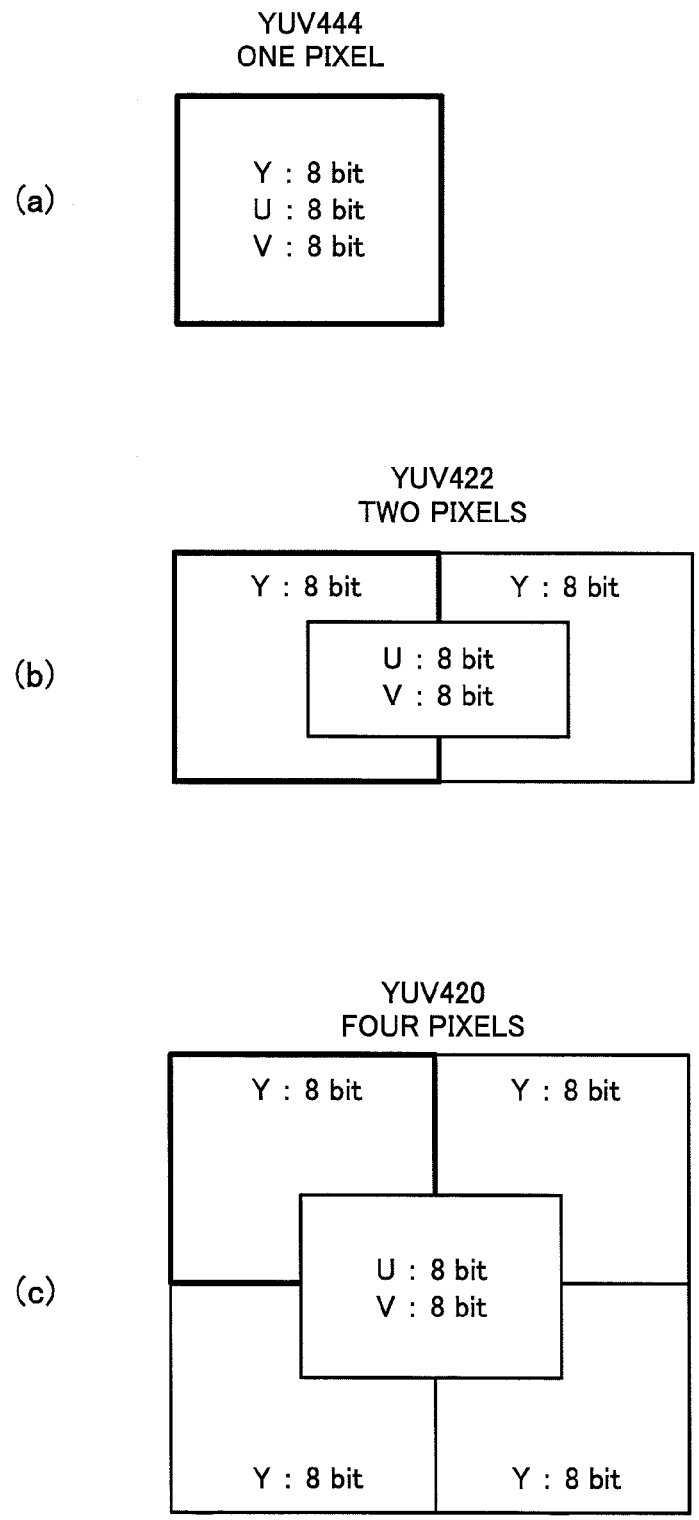
FIG. 32 is a view for describing background art.

For example, description will be given for the case where image data in the YUV422 format is input with FIG. 31. In this case, due to the YUV422 format, as the color calculation processing, the color calculation processing is executed for odd-number pixels (first pixel, third pixel, fifth pixel). In addition, in this case, description will be given with the above-described predetermined threshold as "2".

That is, the first pixel (reference pixel) and the third pixel are compared. Here, since it is known that the second pixel has the same color difference as the first pixel, color calculation 2 is not performed.

Then, the first pixel and the third pixels are judged as similar pixels because an absolute value of difference of the color differences U is 2 (|(−20)−(−22)|) and an absolute value of difference of the color differences V is 2 (|20−22|). Accordingly, color calculation 3 is not performed, and since it is further known that the fourth pixel also has the same color difference with the third pixel, color calculation 4 is not performed.

In addition, between the first pixel and the fifth pixel, an absolute value of difference of the color differences U is 2 (|(−20)−(−22)|) and an absolute value of difference of the color differences V is 3 (|20−23|), thus exceeding the predetermined threshold, and the color calculation processing (color calculation 5) is executed for the fifth pixel.

That is, the second pixel to the fourth pixel are judged as shared pixels (similar pixels), and processing that has conventionally taken time of 5 t is finished in time of 2 t.

Figure 33:
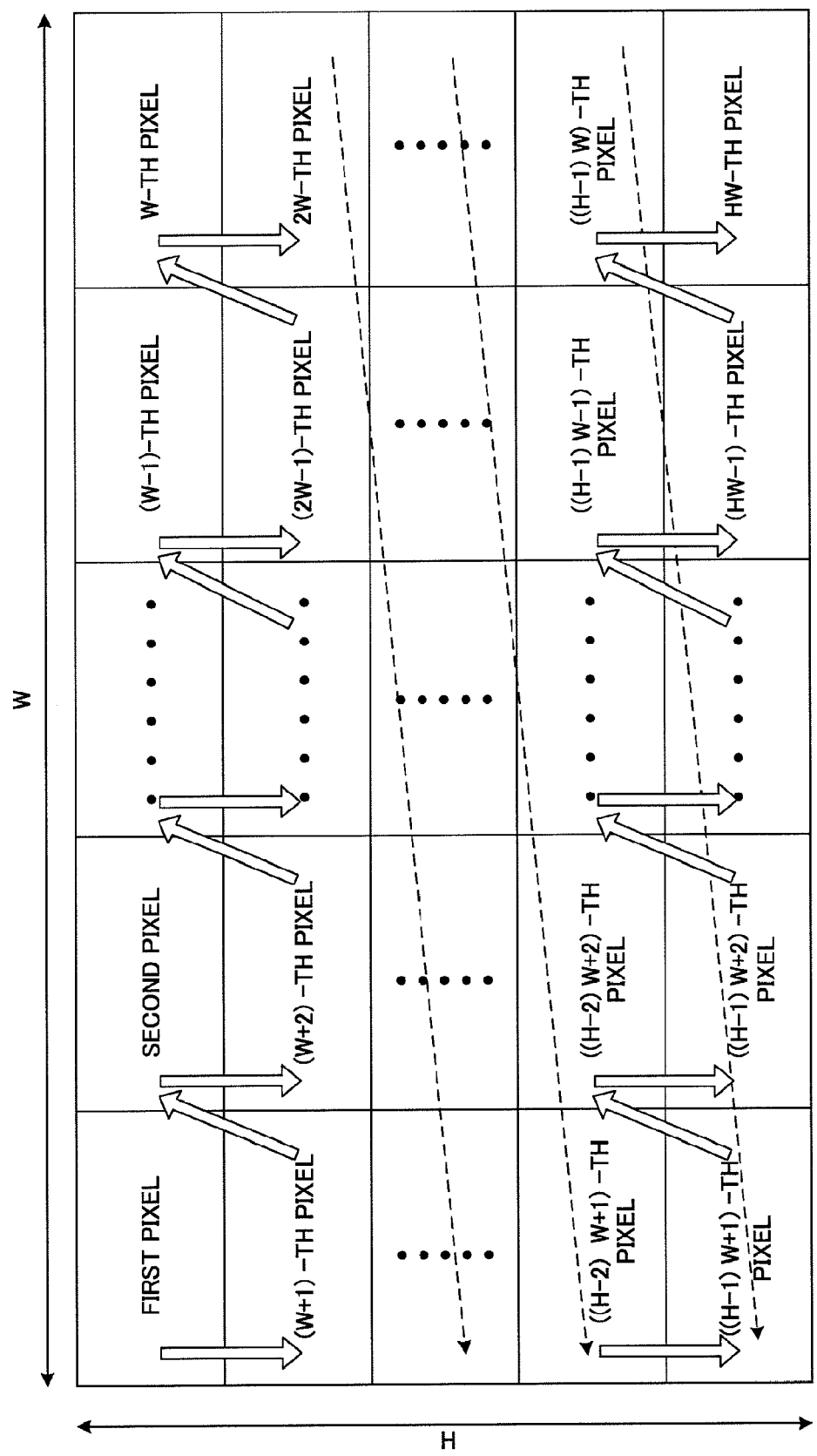
FIG. 33 is a schematic view for describing image data.

Moreover, in the above-described embodiments, for convenience of description, though only the case where pixels in the horizontal direction (lateral direction) is input (read) has been described, similar processing may be of course applied, for example, even for pixels that are input being jagged as shown in FIG. 33. This is because in this case processing is able to be performed without requiring a line memory inside even in the YUV420 format.

Further, it is also possible that input (read out) pixels are stored in an internal frame memory, a line memory or the like for a plurality of pixels and read from the internal memory for processing. In this case, it is also possible to process a plurality of pixels collectively instead of processing one pixel by one pixel. Further, even in the format such as YUV422, when image processing is performed before input to the present color judging apparatus (for example, the color difference value of the shared pixel is complemented using a plurality of pixels), the color difference values are not the same but are close values, but the present processing is applicable even to this case. This is because the color judging apparatus performs processing in accordance with notification signal of the notification signal generation processing because whether the color difference values are the same is not judged in the notification signal generation processing. Even in this case, processing at high speed is possible.

Moreover, though in the above-described embodiments, the example using the YUV format having luminance as an independent element has been described, the format having brightness as an independent element may be used instead.

Since any of the luminance and the brightness do not affect color judgment, even by using a color judgment result for a reference pixel as a color judgment result of a pixel (current pixel) sharing the element other than brightness, it is possible to seek to increase speed of the color judgment processing.

Further, a program operating as the color judging apparatus in this specification is a program that controls a CPU or the like (a program that causes a computer to function) so as to realize the functions of above-described embodiments. In addition, information handled in the apparatuses is temporarily accumulated in a temporal storage apparatus (for example, a RAM (Random Access Memory)) when being processed, is then stored in various storage apparatuses of ROMs (Read Only Memories) or HDDs, and is read out, amended, and written in by the CPU as necessary.

Here, a recording medium to store the program therein may be any one of a semiconductor medium (for example, ROM, nonvolatile memory card, or the like), an optical recording medium and an optical magnetic recording medium (for example, DVD (Digital Versatile Disc), MO (Magneto Optical Disc), MD (Mini Disc), CD (Compact Disc), BD (Blu-ray Disc) (registered trademark), or the like), and a magnetic recording medium (for example, magnetic tape, flexible disk, or the like). In addition, by executing the loaded program, not only the functions of the above-described embodiments are realized, but processing in cooperation with an operating system or another application program, or the like based on an instruction in the program may also realize the functions of the present invention.

In addition, for market distribution, the program may be stored in a portable recording medium to be distributed or may be transferred to a server computer connected via a network such as the Internet. In this case, a storage apparatus of the server computer is also of course included in the present invention.

In addition, a part or all of each apparatus in the above-described embodiments may be realized as an LSI (Large Scale Integration) that is an integrated circuit typically. Each functional block of each apparatus may be individually made into a chip or a part or all of them may be integrally made into a chip. Moreover, a method for converting into an integrated circuit may be realized by a dedicated circuit or a versatile processor without limitation to the LSI. In addition, when a technique of converting into an integrated circuit substitute for the LSI appears with progress of the semiconductor technique, it is of course also able to use the integrated circuit by this technique.

DESCRIPTION OF REFERENCE NUMERALS 1 mobile phone
10 control portion
20 wireless communication portion
22 communication antenna
30 tuner portion
32 receiving antenna
35 camera portion
40 storage portion
42 image data storage area
45 notification signal generating portion
50 video signal processing portion
52 color space converting portion
54 high-speed image processing portion
100 control portion
200 UV color judging portion
300 storage portion
400 image processing portion
54a high-speed image processing circuit
56 image correcting portion
58 gamma correcting portion
60 display portion
65 operation portion
70 microphone portion
75 speaker portion
900 control portion
910 external input portion
920 storage portion
930 video signal processing portion
940 display portion

The invention claimed is:

1. A color judging apparatus comprising:
   a color judging portion that calculates a color judgment result of a pixel included in image data by using a pixel value of the pixel for judgment, and
   a shared pixel judging portion that judges a certain pixel as a reference pixel, and another pixel sharing at least one or more pixel values with the reference pixel as a shared pixel, among pixels included in the image data,
   wherein the color judging portion, when a current pixel that is a pixel subjected to color judgment is judged as the shared pixel by the shared pixel judging portion, regards a color judgment result of the reference pixel as a color judgment result of the current pixel,
   in the shared pixel judging portion, attribute information about the image data is input,
   said another pixel is judged as the shared pixel based on the input attribute information and a color judgment area, the color judgment area being set as an area where the color judging portion performs color judgment in the image data.

2. The color judging apparatus according to claim 1, wherein
   the pixel includes a luminance value or a brightness value as the pixel value, and
   the shared pixel judging portion judges a pixel that has the same pixel value other than the luminance value or the brightness value as the reference pixel, as the shared pixel.

3. The color judging apparatus according to claim 1, wherein
   the shared pixel judging portion generates a luminance distribution of each pixel included in the image data and judges the shared pixel based on the generated luminance distribution.

4. The color judging apparatus according to claim 1, wherein
   the pixel includes an RGB value as the pixel value, and
   the shared pixel judging portion judges a pixel having the same RGB value as each RGB value of the reference pixel as the shared pixel.

5. The color judging apparatus according to claim 1, wherein the color judging portion performs color judgment for the pixel included in the color judgment area.

6. The color judging apparatus according to claim 1, wherein
   for the shared pixel, the color judging portion performs color judgment of color different from a specified color judged in the reference pixel.

7. A color judging method comprising:
   a color judgment step of calculating a color judgment result of a pixel included in image data by using a pixel value of the pixel for judgment, and
   a shared pixel judgment step of judging a certain pixel as a reference pixel, and another pixel sharing at least one or more pixel values with the reference pixel as a shared pixel, among pixels included in the image data, wherein the color judgment step, when a current pixel that is a pixel subjected to color judgment is judged as the shared pixel at the shared pixel judging step, regards a color judgment result of the reference pixel as a color judgment result of the current pixel, in the shared pixel judging step, attribute information about the image data is input, said another pixel is judged as the shared pixel based on the input attribute information and a color judgment area, the color judgment area being set as an area where the color judging portion performs color judgment in the image data.

8. An image processing circuit comprising:

a color judging circuit that calculates a color judgment result of a pixel included in image data by using a pixel value of the pixel for judgment, and a shared pixel judging circuit that judges a certain pixel as a reference pixel, and another pixel sharing at least one or more pixel values with the reference pixel as a shared pixel, among pixels included in the image data, wherein the color judging circuit, when a current pixel that is a pixel subjected to color judgment is judged as the shared pixel by the shared pixel judging circuit, regards a color judgment result of the reference pixel as a color judgment result of the current pixel, in the shared pixel judging circuit, attribute information about the image data is input, said another pixel is judged as the shared pixel based on the input attribute information and a color judgment area, the color judgment area being set as an area where the color judging portion performs color judgment in the image data.

9. A non-transitory computer-readable medium storing a program causing a computer to realize a color judgment function of calculating a color judgment result of a pixel included in image data by using a pixel value of the pixel for judgment, wherein a shared pixel judgment function that judges a certain pixel as a reference pixel, and another pixel sharing at least one or more pixel values with the reference pixel as a shared pixel, among pixels included in the image data, is realized, and the color judgment function, when a current pixel that is a pixel subjected to color judgment is judged as the shared pixel by the shared pixel judgment function, regards a color judgment result of the reference pixel as a color judgment result of the current pixel, in the shared pixel judging function, attribute information about the image data is input, said another pixel is judged as the shared pixel based on the input attribute information and a color judgment area, the color judgment area being set as an area where the color judging portion performs color judgment in the image data.

10. The color judging apparatus according to claim 2, wherein the shared pixel judging portion generates a luminance distribution of each pixel included in the image data and judges the shared pixel based on the generated luminance distribution.

11. The color judging apparatus according to claim 2, wherein for the shared pixel, the color judging portion performs color judgment of color different from a specified color judged in the reference pixel.

\* \* \* \* \*